(12) United States Patent  
Sakai et al.

(10) Patent No.: US 12,099,323 B2
(45) Date of Patent: Sep. 24, 2024

(54) POWER SUPPLY APPARATUS FOR SUPPLYING VARIOUS VOLTAGES AND IMAGE FORMING APPARATUS OPERATING ON VOLTAGE SUPPLIED FROM POWER SUPPLY APPARATUS

(71) Applicant: CANON KABUSHIKI KAISHA, Tokyo (JP)

(72) Inventors: Masayuki Sakai, Kanagawa (JP); Shuichiro Sugimoto, Kanagawa (JP); Toshiaki Sugiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/455,521

(22) Filed: Aug. 24, 2023

(65) Prior Publication Data

US 2024/0004337 A1    Jan. 4, 2024

Related U.S. Application Data

(63) Continuation of application No. 17/840,468, filed on Jun. 14, 2022, now Pat. No. 11,841,666.

(30) Foreign Application Priority Data

Jun. 17, 2021  (JP) ................................ 2021-101027
Dec. 17, 2021  (JP) ................................ 2021-205468

(51) Int. Cl.
*G03G 15/00*    (2006.01)
*G03G 15/06*    (2006.01)
(Continued)

(52) U.S. Cl.
CPC ............ *G03G 15/80* (2013.01); *G03G 15/065* (2013.01); *G03G 15/0808* (2013.01);
(Continued)

(58) Field of Classification Search
CPC .............. G03G 15/0266; G03G 15/065; G03G 15/0808; G03G 15/5004; G03G 15/80;
(Continued)

(56) References Cited

U.S. PATENT DOCUMENTS

2010/0303486 A1    12/2010    Shibata
2015/0261122 A1    9/2015    Hayashi
2016/0116883 A1*   4/2016    Tatsuzue ............... G03G 15/80
                                                        399/88

FOREIGN PATENT DOCUMENTS

JP    H02278273 A    11/1990
JP    2004191766 A    7/2004

* cited by examiner

*Primary Examiner* — Sophia S Chen
(74) *Attorney, Agent, or Firm* — Canon U.S.A., Inc. IP Division

(57) ABSTRACT

A power supply apparatus generates an output voltage. A boost circuit boosts a voltage supplied from a reference voltage source and generates a first power supply voltage. A processor controls switching the boost circuit on and off. A first transistor is connected to the first power supply voltage. A second transistor is connected to a collector of the first transistor. A resistance element is connected to a collector of the second transistor. A voltage source is connected to the resistance element and generates a second power supply voltage. A collector voltage, which is an output voltage, of the second transistor is controlled by controlling an amount of base current of the first transistor.

18 Claims, 23 Drawing Sheets

(51) Int. Cl.
  *G03G 15/08* (2006.01)
  *H02M 3/158* (2006.01)
(52) U.S. Cl.
  CPC ........ *G03G 15/5004* (2013.01); *H02M 3/158* (2013.01); *G03G 2215/00978* (2013.01)
(58) Field of Classification Search
  CPC .......... G03G 2215/00978; H02M 1/00; H02M 1/0006; H02M 1/0045; H02M 1/008; H02M 1/32; H02M 3/28; H02M 3/155; H02M 3/156; H02M 3/158; H02M 3/33507
  See application file for complete search history.

FIG. 11
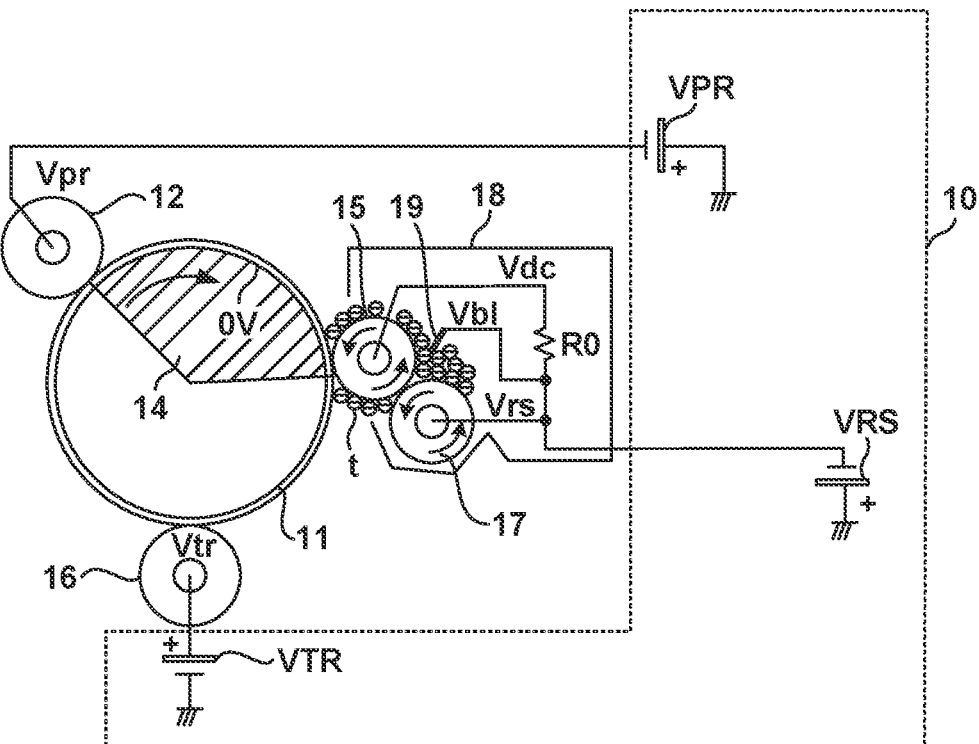
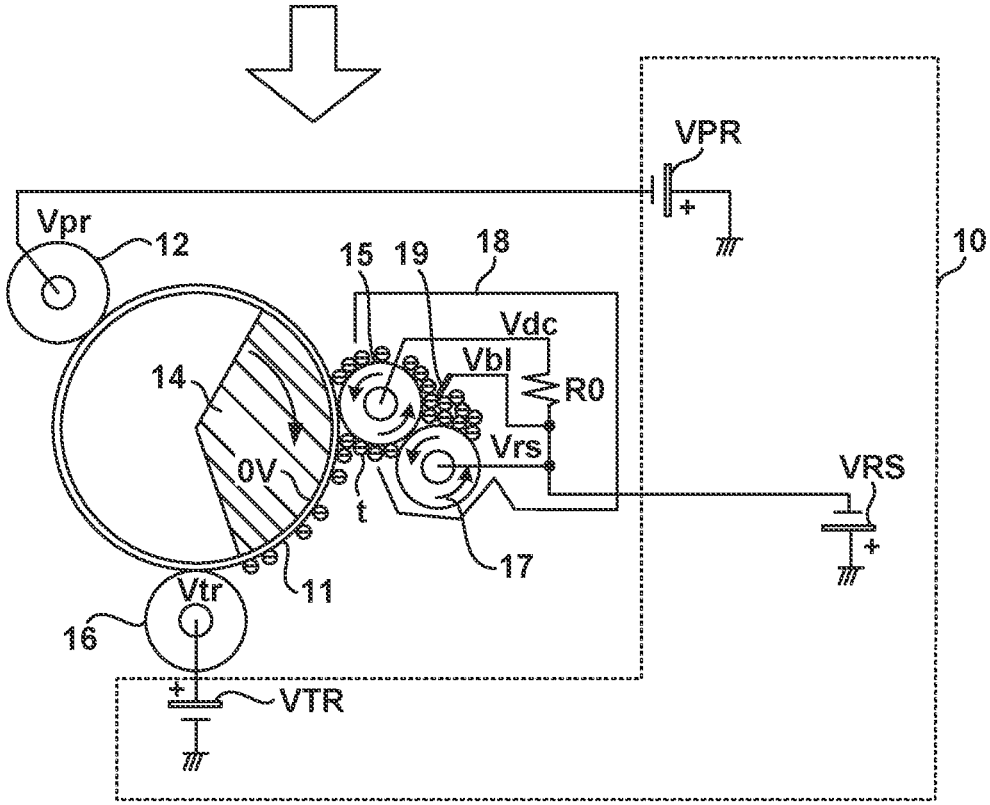

FIG. 12
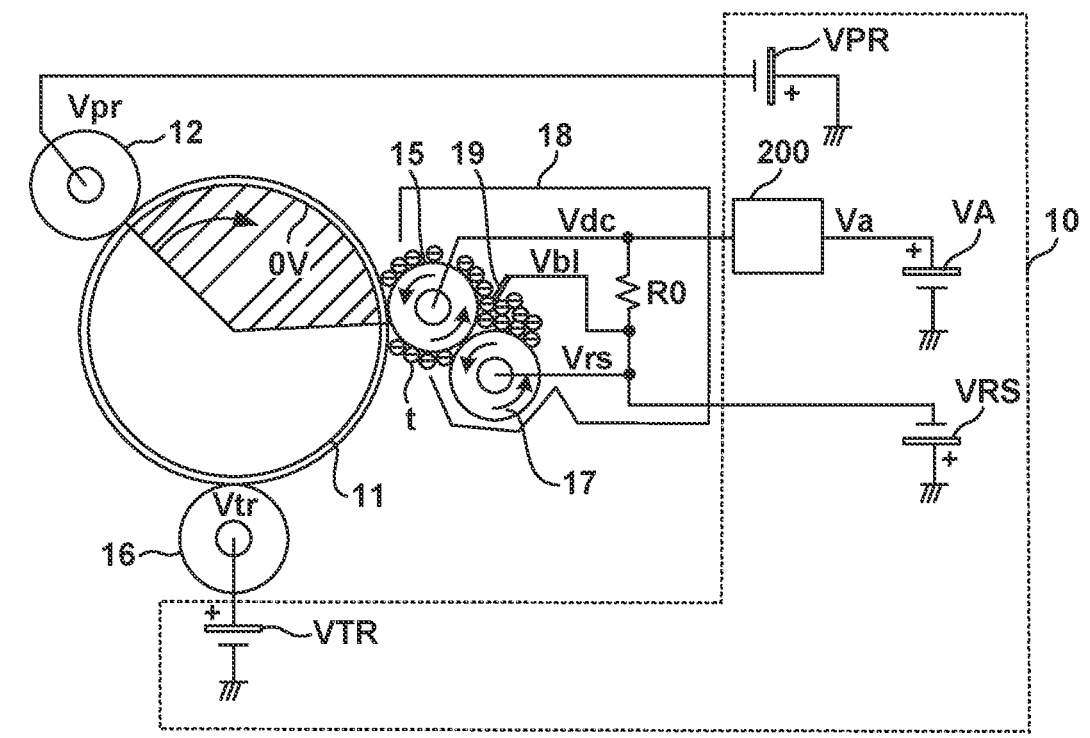
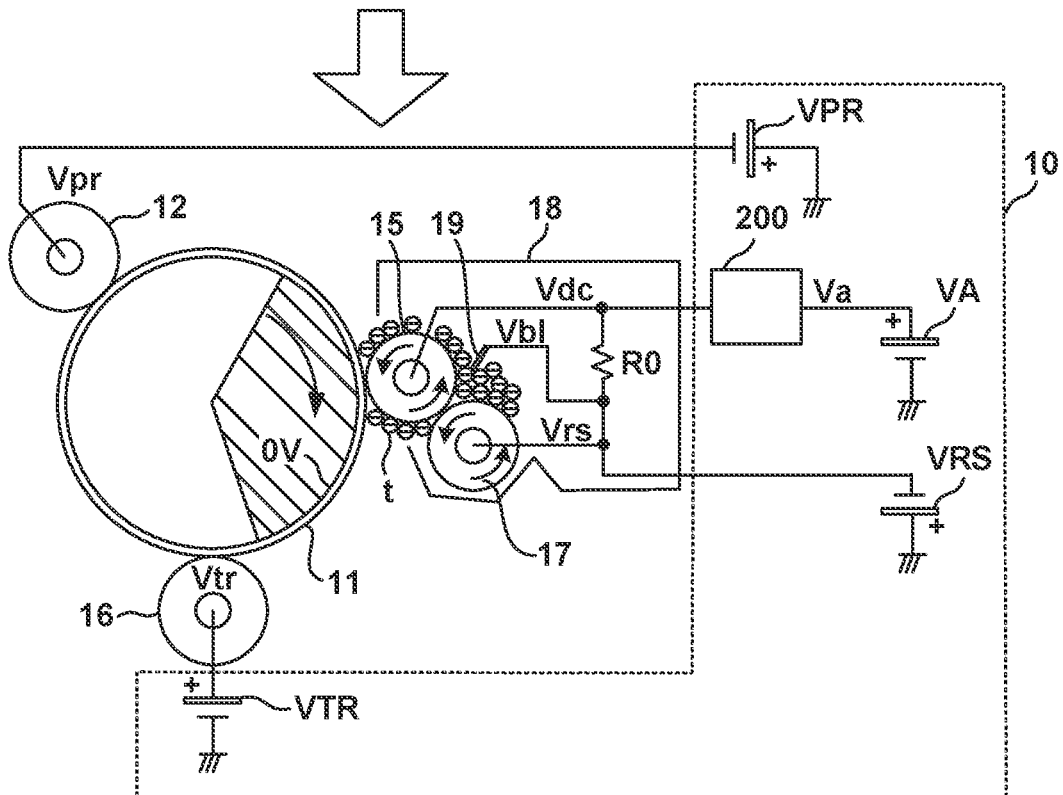

POWER SUPPLY APPARATUS FOR SUPPLYING VARIOUS VOLTAGES AND IMAGE FORMING APPARATUS OPERATING ON VOLTAGE SUPPLIED FROM POWER SUPPLY APPARATUS

CROSS-REFERENCE TO RELATED APPLICATIONS

This application is a Continuation of co-pending U.S. patent application Ser. No. 17/840,468 filed Jun. 14, 2022, which claims priority benefit of Japanese Patent Application No. 2021-101027, filed Jun. 17, 2021 and Japanese Patent Application No. 2021-205468, filed Dec. 17, 2021. The disclosures of the above-named applications are hereby incorporated by reference herein in their entireties.

BACKGROUND

Field

The present disclosure relates to a power supply apparatus for supplying various voltages and an image forming apparatus operating on voltage supplied from a power supply apparatus.

Description of the Related Art

In an electrophotographic image forming apparatus, various high voltages are used in forming toner images and accelerating transfer. A photosensitive drum is uniformly charged by a charging voltage, the toner is adhered to the photosensitive drum by a development voltage, and a toner image is transferred to a sheet by a transfer voltage. In U.S. Pat. No. 7877036, a power supply circuit for generating such high voltages is described.

However, a photosensitive drum starts rotating before the development voltage reaches the target voltage for image formation. This is because a certain amount of waiting time is needed for the photosensitive drum to rotate stably at a constant rotational speed. In the disclosure of U.S. Pat. No. 7877036, techniques for preventing toner from unintentionally adhering to the photosensitive drum from the developing roller during such waiting time is not discussed in great detail.

SUMMARY

According to one embodiment of the present disclosure, a power supply apparatus is provided for generating an output voltage, the apparatus comprising: a boost circuit configured to boost a voltage supplied from a reference voltage source and generates a first power supply voltage; a processor configured to control switching the boost circuit on and off; a first transistor with an emitter connected to the first power supply voltage; a second transistor with an emitter connected to a collector of the first transistor; a resistance element with one end connected to a collector of the second transistor; and a voltage source connected to another end of the resistance element, the voltage source being for generating a second power supply voltage with a polarity opposite to a polarity of the first power supply voltage, wherein a collector voltage, which is an output voltage, of the second transistor is controlled by controlling an amount of base current of the first transistor.

Further features of the present disclosure will become apparent from the following description of example embodiments (with reference to the attached drawings).

BRIEF DESCRIPTION OF THE DRAWINGS

FIG. 11 is a diagram for describing the cause of toner transferring to a back surface of a sheet according to one embodiment.

FIG. 12 is a diagram for describing a method for reducing the likelihood of toner transferring to a back surface of a sheet according to one embodiment.

DESCRIPTION OF THE EMBODIMENTS

Figure 1:
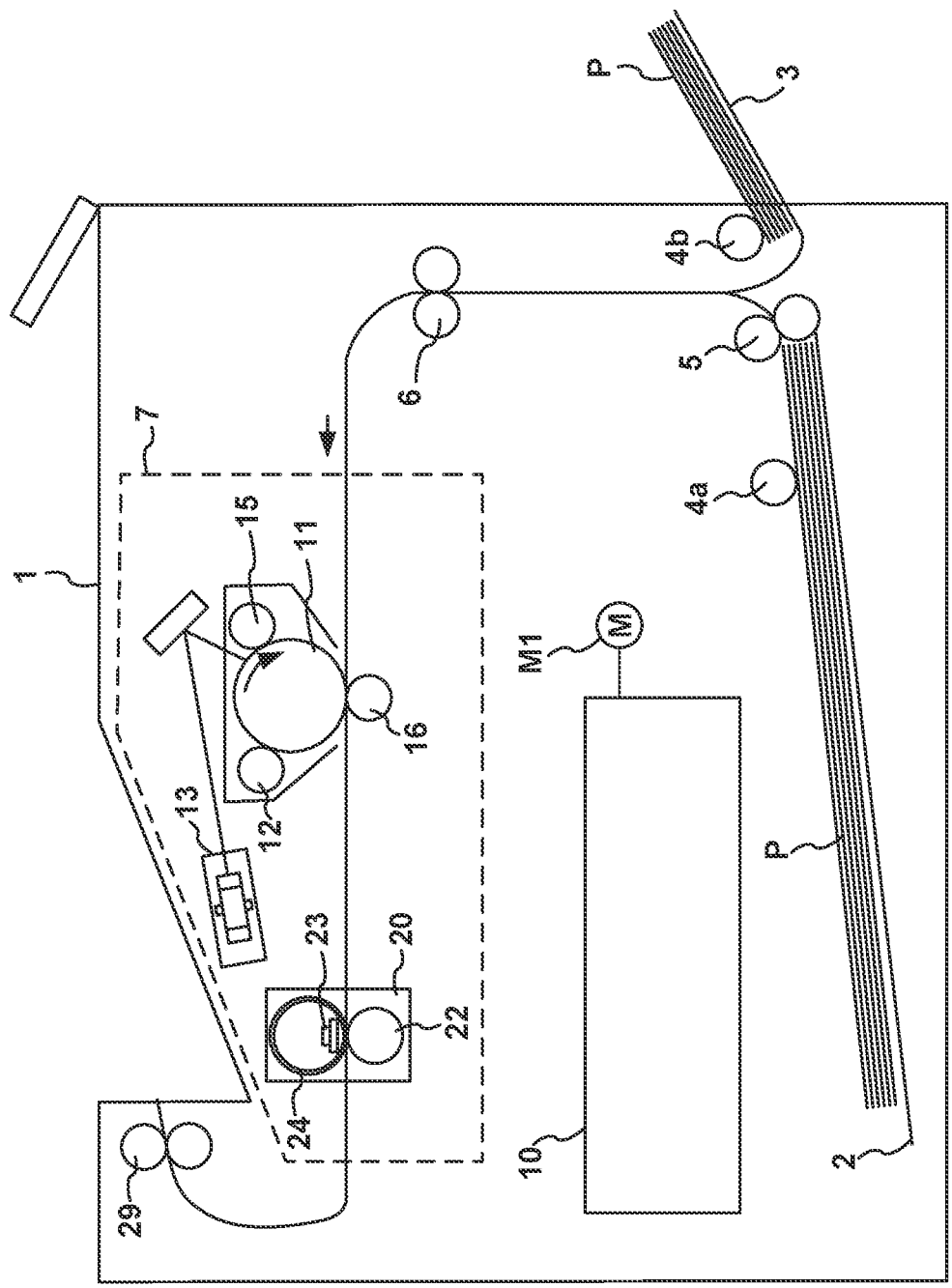
FIG. 1 is a diagram for describing an image forming apparatus according to one embodiment.

Hereinafter, some example embodiments will be described in detail with reference to the attached drawings. Note, the following example embodiments are not intended to limit the scope of the claimed invention. Multiple features are described in the described embodiments, but limitation is not made embodiments of the invention that requires all such features, and multiple such features may be combined as appropriate. Furthermore, in the attached drawings, the same reference numerals are given to the same or similar configurations, and redundant description thereof is omitted.

An image forming apparatus comprises a photosensitive drum which is driven by a motor and which rotates in predetermined direction. A circumferential surface (surface) of the photosensitive drum is charged by a charging roller while the photosensitive drum is rotating. Just after the photosensitive drum starts rotating, a surface potential of a circumferential surface section of the surface from the charging roller to a developing roller is unchanged at 0 V. The circumferential surface section with a surface potential of 0V then reaches the developing roller. In a case where a development voltage is a (negative) voltage less than 0 V, a toner with a negative polarity moves from the developing roller to the photosensitive drum. When the photosensitive drum rotates further, the toner reaches a transfer roller and is transferred onto the transfer roller. In this manner, the transfer roller is marked with the toner. Thereafter, toner may be transferred from the transfer roller to the back surface of the sheet and cause an image defect including the back surface of the sheet being marked and the like.

In this manner, just after the photosensitive drum starts rotating, the surface potential is 0 V and the surface of the photosensitive drum is not charged. In this state, if the development voltage is set to a voltage with high positive polarity, toner can be prevented from moving to the photosensitive drum. Note that this is not limited to a power supply apparatus of an image forming apparatus, and there are power supply apparatuses for which switching the polarity of the output voltage is necessary. Thus, being capable of switching the polarity of the output voltage with a simple circuit configuration would also be useful for a power supply apparatus for another such electronic device.

Example 1

Image Forming Apparatus

FIG. 1 is a diagram illustrating an electrophotographic image forming apparatus 1. A feed cassette 2 and a feed tray 3 are storage units for storing sheets P. Feeding rollers 4a, 4b are supply units for feeding the sheets P to the conveyance path and supplying an image forming unit 7. A pair of conveyance rollers 5 for conveying the sheets P and a pair of registration rollers 6 are provided on the conveyance path. The image forming unit 7 is provided with a photosensitive drum 11 for carrying an electrostatic latent image and a toner image. The photosensitive drum 11 is driven by a motor M1 and rotates. A charging roller 12 applies a charging voltage Vpr from a power supply apparatus 10 and uniformly charges the surface of the photosensitive drum 11. An exposure apparatus 13 includes a semiconductor laser, modulates a laser beam using image signals corresponding to an input image, and scans the top of the photosensitive drum 11 with the laser beam. In this manner, an electrostatic latent image is formed. Because the exposure apparatus 13 scans light using a rotating polygon mirror, it may be referred to as an optical scanning device. A developing roller 15 applies a development voltage Vdc from the power supply apparatus 10, develops an electrostatic latent image using the toner, and forms a toner image. A transfer roller 16 applies a transfer voltage Vtr from the power supply apparatus 10 and transfers a toner image conveyed by the photosensitive drum 11 onto the sheet P. A fixing device 20 applies heat and pressure to the toner image transferred onto the sheet P while conveying the sheet P and fixes the toner image to the sheet P. A pressing roller 22 is biased to come into contact with a fixing film 24. A heater 23 is in contact with the inner circumferential surface of the cylindrical fixing film 24 and heats the fixing film 24 to increase the fixing temperature to a target temperature. A discharge roller 29 discharges the sheet P with the toner image fixed by the fixing device 20.

Figure 2:
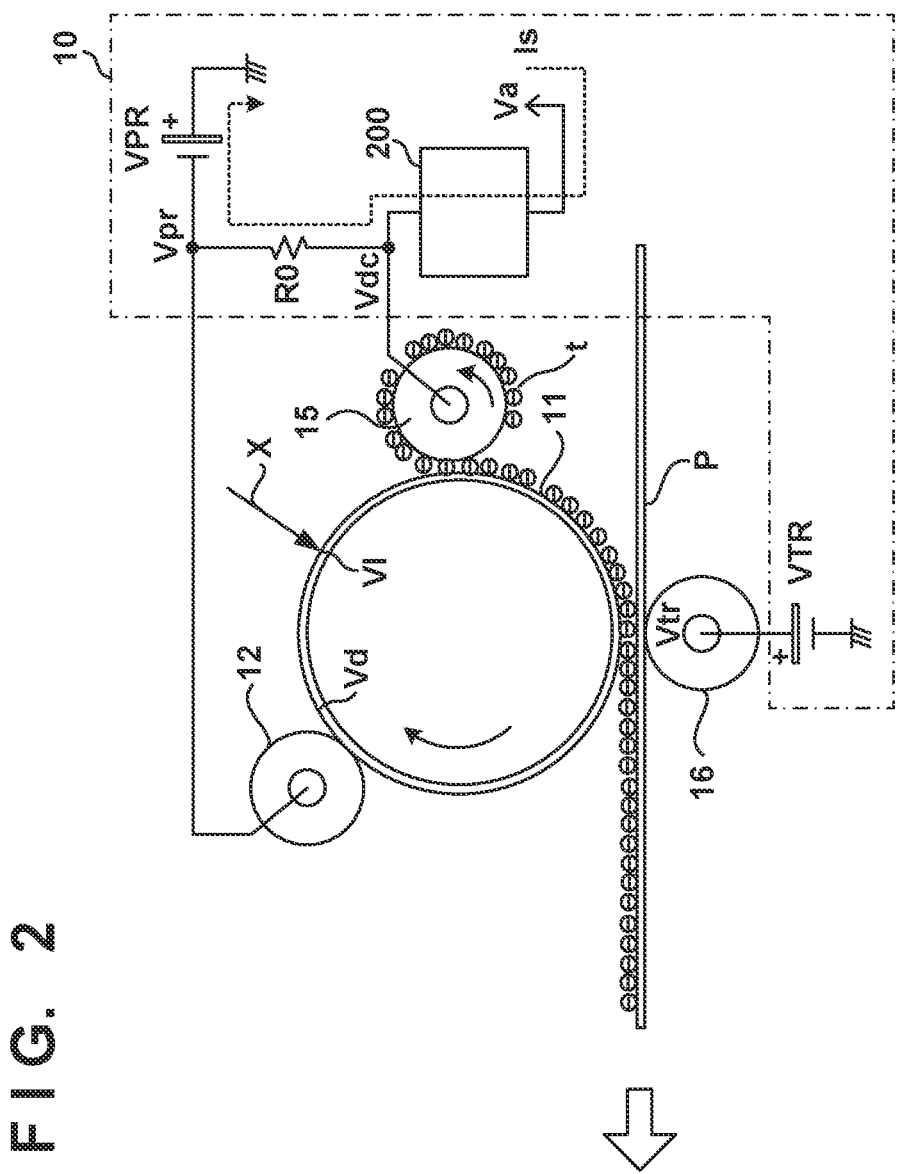
FIG. 2 is an enlarged view of an image forming unit according to one embodiment.

FIG. 2 is a cross-sectional view of the image forming unit 7. The power supply apparatus 10 includes a power supply VPR that generates the charging voltage Vpr, a power supply VTR that generates the transfer voltage Vtr, and a bias circuit 200 that generates the development voltage Vdc. The charging voltage Vpr is −1000 V, for example. The charging roller 12 charges the surface of the photosensitive drum 11 so that the surface potential of the photosensitive drum 11 is equal to a dark area potential Vd. The dark area potential Vd is −700 V, for example. The photosensitive drum 11 is irradiated with a laser beam X while being rotated in a clockwise direction by the motor M1. After the surface of the photosensitive drum 11 is destaticized by being irradiated with the laser beam X, the surface potential changes from the dark area potential Vd to a light area potential Vl. The light area potential Vl is −100 V, for example. Then, the photosensitive drum 11 rotates further, and the surface of the photosensitive drum 11 reaches a contact portion with the developing roller 15. When an image is formed, the development voltage Vdc applied to the developing roller 15 is −400 V, for example. Toner t is adhered around the developing roller 15. The toner t is a powder with a negative charge. The light area potential Vl (−100 V) is higher than the development voltage Vdc (−400 V). Because the regular polarity of the toner t in the present example is negative polarity, the toner t adheres to the surface of the photosensitive drum 11 due to the potential difference between the development voltage Vdc and the light area potential Vl. When the photosensitive drum 11 rotates further, a nip portion formed together with the transfer roller 16 disposed on opposite sides of the sheet P is reached. The transfer voltage Vtr applied to the transfer roller 16 is +1000 V, for example. The transfer voltage Vtr (+1000 V) is higher than the light area potential Vl (−100 V). Thus, the toner t moves from the photosensitive drum 11 to the sheet P. As illustrated in FIG. 2, the development voltage Vdc is generated by the bias circuit 200, a shunt resistor R0, and the power supply VPR.

Bias Circuit

Figure 3:
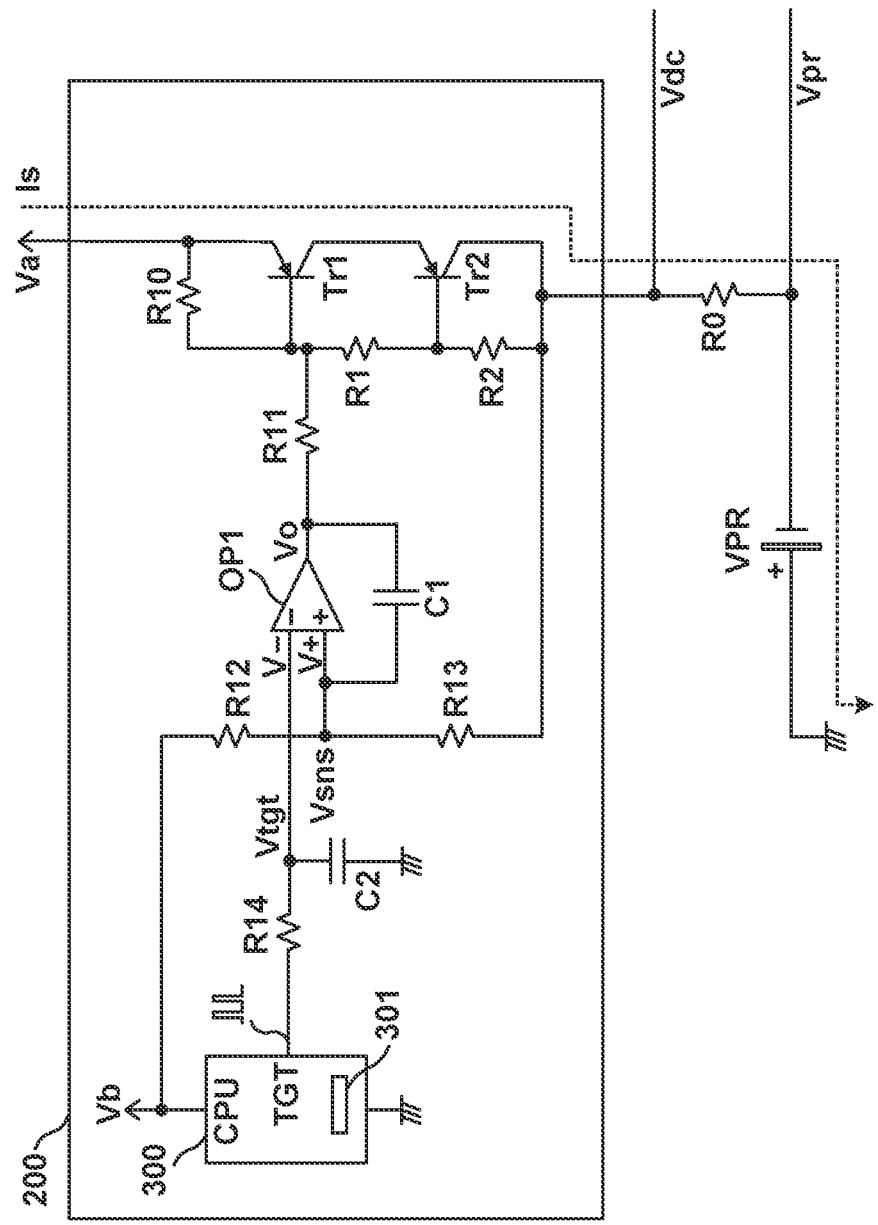
FIG. 3 is a circuit diagram of a bias circuit according to one embodiment.

FIG. 3 is a diagram illustrating the bias circuit 200. A regulated voltage Va (for example, +24 V) is supplied from a power supply circuit inside the power supply apparatus 10. An emitter of a transistor Tr1 is connected to the power supply circuit of the power supply apparatus 10 and applies the regulated voltage Va. The collector of the transistor Tr1 is connected to an emitter of a transistor Tr2. A collector of the transistor Tr2 is connected to one end of the shunt resistor R0 and the developing roller 15. The other end of the shunt resistor R0 is connected to the charging roller 12 and a minus terminal of the power supply VPR. A CPU 300 is a central processing unit for controlling the power supply apparatus 10 and may be installed outside of the bias circuit 200. The CPU 300 is supplied with a regulated voltage Vb (for example, +3.3 V) from the power supply circuit of the power supply apparatus 10. The CPU 300 outputs a PWM signal for setting the development voltage Vdc to a target voltage from an output terminal TGT. PWM stands for pulse width modulation. A PWM signal is a type of rectangular wave. The CPU 300 sets the target voltage by adjusting the duty ratio of the PWM signal. The PWM signal is smoothed by a smoothing circuit formed by a resistor R14 and a capacitor C2, and is converted to the set voltage Vtgt. A set voltage Vtgt is a voltage proportional to the target voltage. The set voltage Vtgt is input to an inverting input terminal V− of an operational amplifier OP1. A detected voltage Vsns proportional to the development voltage Vdc is input to a non-inverting input terminal V+ of the operational amplifier OP1. Resistors R12 and R13 form a voltage divider circuit. The development voltage Vdc is divided by the voltage divider circuit and converted into the detected voltage Vsns proportional to the development voltage Vdc. A capacitor C1 is connected between the non-inverting input terminal V+ and the output terminal of the operational amplifier OP1. The output terminal of the operational amplifier OP1 is connected to the base of the transistor Tr1 via a current limiting resistor R11. A resistor R10 for malfunction prevention is connected between the emitter base of the transistor Tr1. Resistors R1 and R2 are connected in series and form a voltage divider circuit. The resistance value of the resistor R1 and the resistance value of the resistor R2 may be the same. The voltage divider circuit is connected between the base of the transistor Tr1 and the output terminal of the development voltage Vdc. Thus, a voltage proportional to the development voltage Vdc is applied to the base of the transistor Tr2.

As illustrated in FIG. 3, a shunt current Is flows from the power supply apparatus 10 to the ground via the bias circuit 200. When the transistors Tr1 and Tr2 are switched on, the shunt current Is flows to the shunt resistor R0 via the transistors Tr1 and Tr2. The CPU 300 controls the development voltage Vdc by appropriately increasing or decreasing the magnitude of the shunt current Is.

$$Vdc=Vpr+R0\times Is \qquad \text{Eq1}$$

Here, in a case where the detected voltage Vsns is higher than the set voltage Vtgt, an output voltage Vo of the operational amplifier OP1 increases. Accordingly, the base current of the transistor Tr1 decreases, and the collector current (shunt current Is) of the transistor Tr1 decreases. When the shunt current Is decreases, as per Formula Eq1, the development voltage Vdc decreases. As a result, the detected voltage Vsns also decreases.

On the other hand, in a case where the detected voltage Vsns is lower than the set voltage Vtgt, the output voltage Vo decreases. Accordingly, the base current of the transistor Tr1 increases, and the collector current (shunt current Is) of the transistor Tr1 increases. When the shunt current Is increases, as per Formula Eq1, the development voltage Vdc increases, and the detected voltage Vsns also increases. In this manner, a negative feedback is applied to the operational amplifier OP1, and the detected voltage Vsns becomes equal to the set voltage Vtgt. As a result, the development voltage Vdc is maintained at the target voltage.

A memory 301 may, in advance, store a table listing the relationships between the duty ratio (i.e., set voltage Vtgt) of the PWM signal and the development voltage Vdc. The CPU 300 determines the set voltage Vtgt (i.e., the duty ratio of the PWM signal) corresponding to the target voltage of the development voltage Vdc by referencing the table. Here, the higher the duty ratio (i.e., the set voltage Vtgt), the higher the development voltage Vdc.

The voltage applied to the base of the transistor Tr1 is a voltage equal to the regulated voltage Va minus the base emitter voltage of the transistor Tr1. The base emitter voltage is 0.6 V, for example, and is a very low voltage. Thus, the base emitter voltage may be considered to be substantially zero. Accordingly, the regulated voltage Va is applied to one end (the upper terminal in FIG. 3) of the resistor R2. The development voltage Vdc is applied to the other end (the lower terminal in FIG. 3) of the resistor R1. The base of the transistor Tr2 is connected to the voltage divider point of the resistors R1 and R2. Thus, a voltage between the regulated voltage Va and the development voltage Vdc is applied to the base of the transistor Tr2. As a result, the emitter-collector voltage of the transistor Tr1 becomes roughly equal to the emitter-collector voltage of the transistor Tr2.

Figure 4:
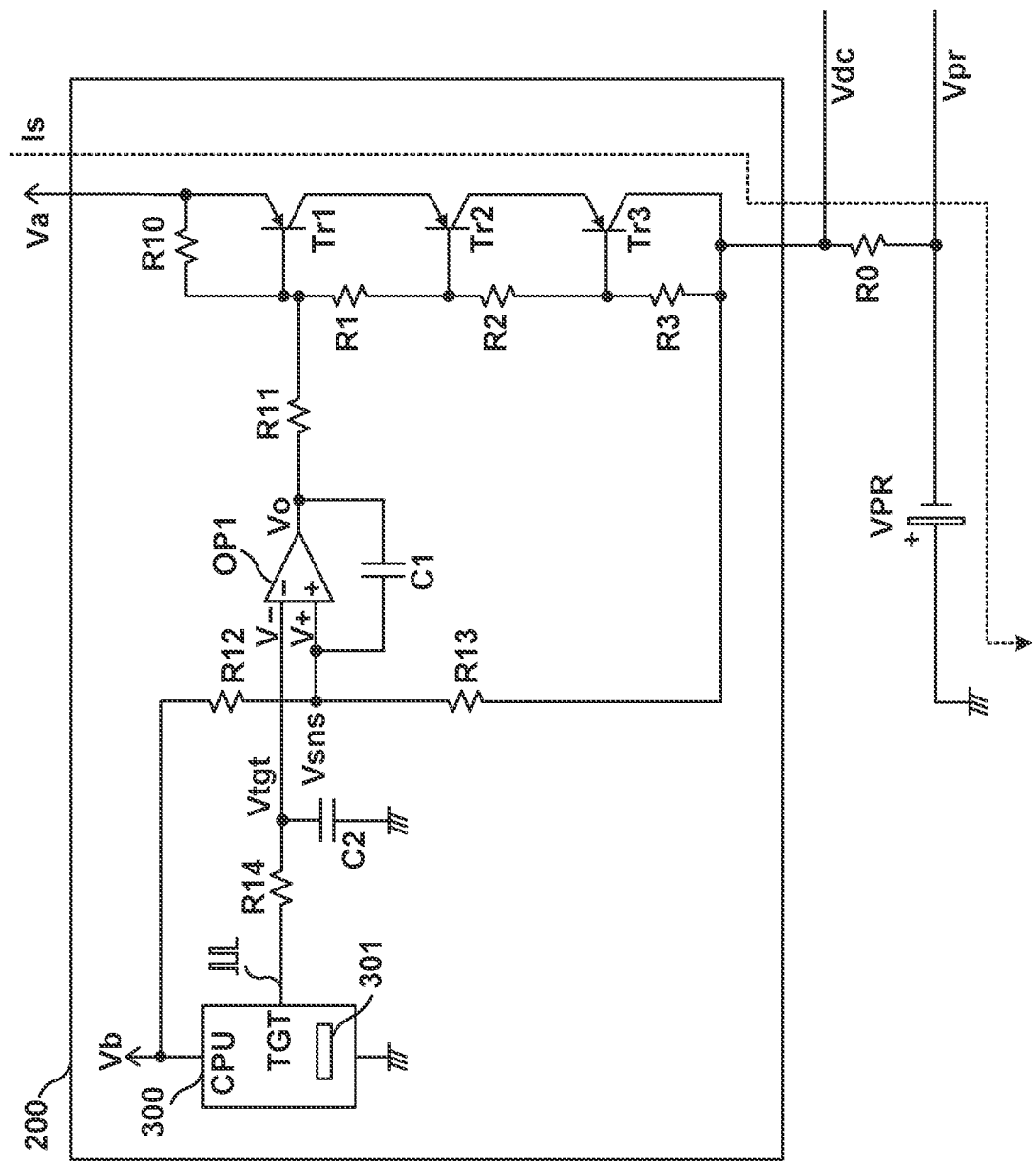
FIG. 4 is a circuit diagram of a bias circuit according to one embodiment.

By using N number of transistors or more (N being an integer of two or more), such as in the case of the transistors Tr1 and Tr2, the emitter-collector voltage is distributed between N number of transistors. Accordingly, low-cost transistors with a low withstand voltage can be used. For example, as illustrated in FIG. 4, a transistor Tr3 and a resistor R3 may be added. In this manner, the emitter-collector voltage may be distributed between the three transistors Tr1, Tr2, and Tr3. As a result, transistors with an even lower withstand voltage can be used.

Figure 5:
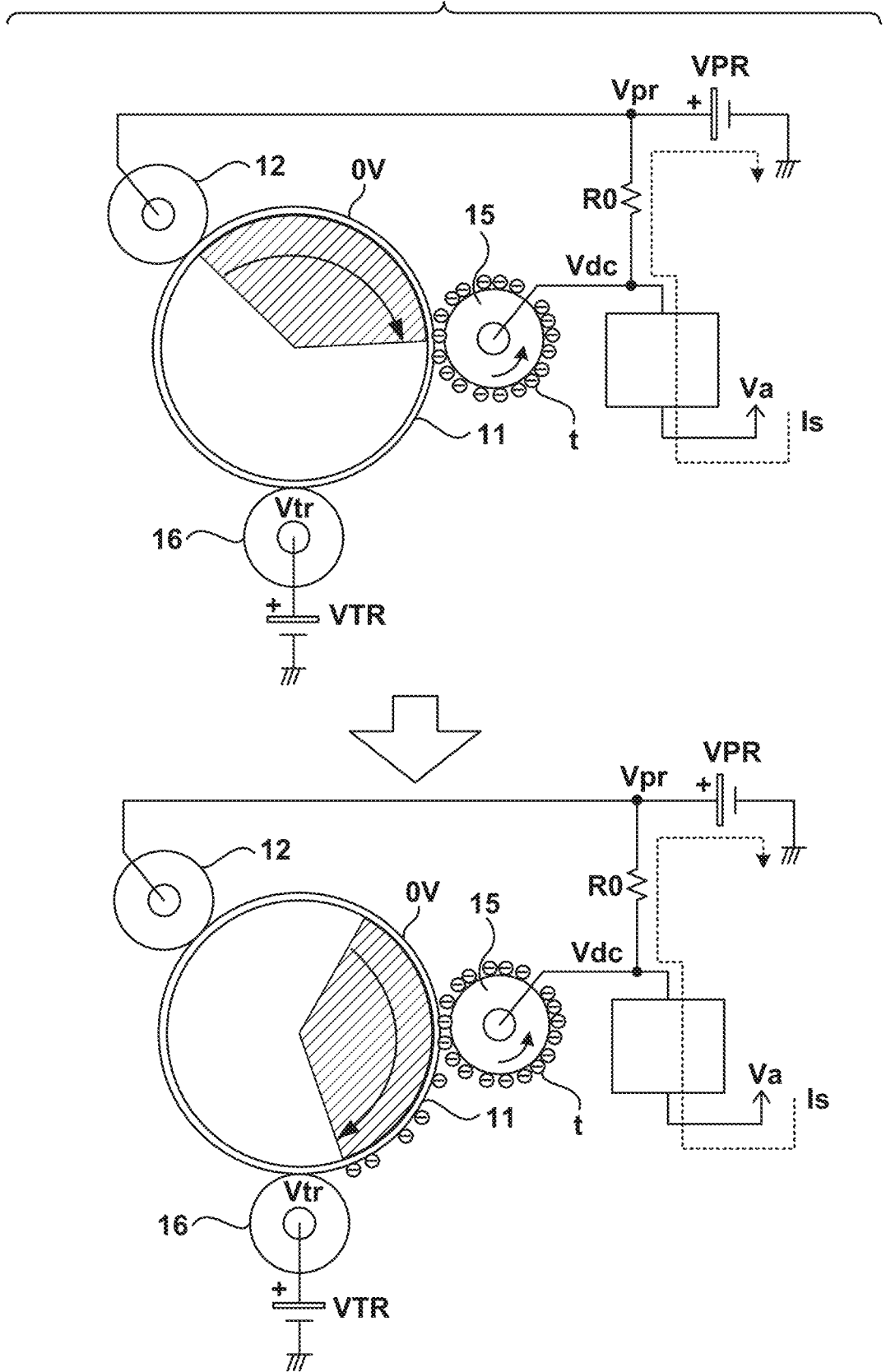
FIG. 5 is a diagram for describing why toner marks a back surface of a sheet according to one embodiment.

As illustrated in FIG. 5, when the photosensitive drum 11 is driven by the motor M1 and starts rotating, the surface potential of the sector portion with diagonal lines is unchanged at 0 V. The sector portion with a surface potential of 0 V then reaches the developing roller 15. In a case where the development voltage Vdc is a (negative) voltage less than 0 V, the toner t with a negative regular polarity moves from the developing roller 15 to the photosensitive drum 11. When the photosensitive drum 11 rotates further, the toner t reaches the transfer roller 16 and is transferred onto the transfer roller 16. In this manner, the transfer roller 16 is marked with the toner t. Thereafter, toner t may be transferred from the transfer roller 16 to the back surface of the sheet P and cause the back surface of the sheet P to be marked. This is particularly pronounced in a configuration in which the developing roller 15 is unable to operate separated from the photosensitive drum 11, for example, in a configuration in which the motor M1 starts running with the photosensitive drum 11 and the developing roller 15 in contact with one another.

In this manner, just after the photosensitive drum 11 starts rotating, the surface potential is 0 V and the surface of photosensitive drum 11 is not charged. In this state, the development voltage Vdc should be set to a voltage with high positive polarity to inhibit the toner t from moving onto the photosensitive drum 11. In this manner, the amount of toner t that adheres to the photosensitive drum 11 is reduced.

However, in a case where the regulated voltage Va (for example, +24 V) is applied as is as the development voltage Vdc, the effect of inhibiting adhesion of the toner t is minimal. To sufficiently inhibit adhesion of the toner t, the development voltage Vdc may be set to +100 V or greater. To set the development voltage Vdc to +100 V or greater, it is plausible to change the regulated voltage Va to +100 V or greater. The issue in this case is the emitter-collector withstand voltage of the transistors Tr1 and Tr2. The development voltage Vdc during image formation must be controlled to a negative voltage (for example, −400 V). For example, in a case where the collector emitter withstand voltage of the transistors Tr1 and Tr2 is 500 V (250 V×2), the emitter-collector of the transistors Tr1 and Tr2 exceed the withstand voltage. As a result, there is a high likelihood that the transistors Tr1 and Tr2 will fail.

Figure 6:
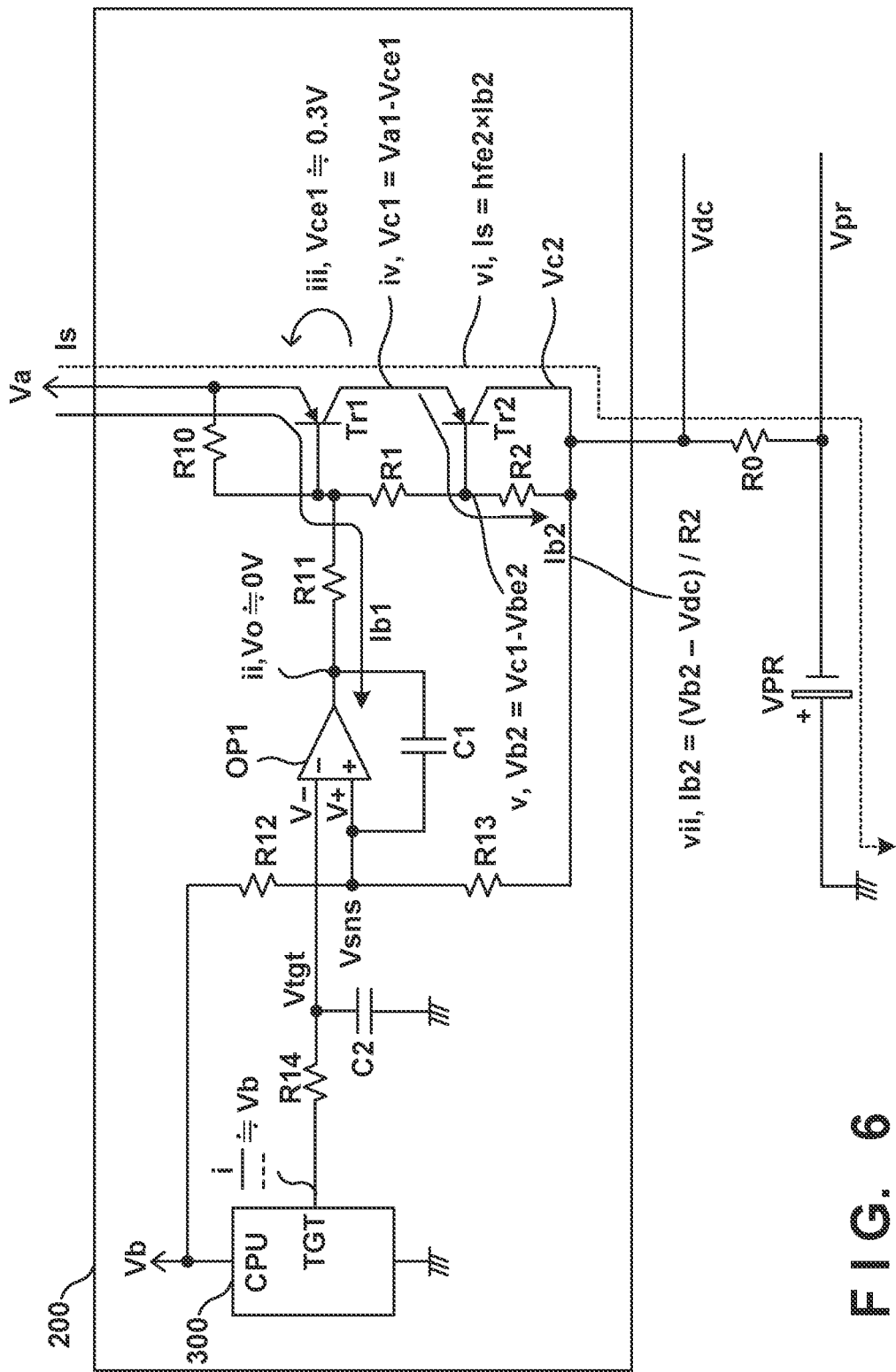
FIG. 6 is a diagram for describing the operations of a bias circuit according to one embodiment.

Furthermore, as illustrated in FIG. 6, even when the set voltage Vtgt is set to a maximum value, there are cases where the development voltage Vdc cannot be a positive voltage. The cause of this is as follows.

(i) The CPU 300 sets the duty ratio of the PWM signal output from the output terminal TGT to the maximum value. In this case, the set voltage Vtgt becomes roughly the regulated voltage Vb.

(ii) The output voltage Vo of the operational amplifier OP1 is roughly 0 V.

(iii) A base current Ib1 of the transistor Tr1 increases, saturating the transistor Tr1. As a result, the emitter-collector voltage Vce1 of the transistor Tr1 becomes roughly 0.3 V.

(iv) A collector voltage Vc1 of the transistor Tr1 is the difference between the regulated voltage Va and the emitter-collector voltage Vce1.

$$Vc1 = Va1 - Vce1 \quad \text{Eq 2}$$

(v) A base current Ib2 flows through the transistor Tr2, and a base voltage Vb2 of the transistor Tr2 is Vc1−Vbe2. Vbe2 is the base emitter voltage of the transistor Tr2.

$$Vb2 = Vc1 - Vbe2 \quad \text{Eq 3}$$

(vi) In a case where the current amplification factor of the transistor Tr2 is hfe2, the shunt current Is flows through the transistor Tr2.

$$Is = hfe2 \times Ib2 \quad \text{Eq 4}$$

(vii) A collector voltage Vc2 of the transistor Tr2 is equal to the development voltage Vdc. Thus, the base current Ib2 of the transistor Tr2 is represented by the following equation.

$$Ib2 = \frac{(Vb2 - Vdc)}{R2} \quad \text{Eq 5}$$

Equation 6 is obtained by rearranging Equation 5 from Equation 1.

$$Vdc = \frac{R2 \times Vpr + R0 \times hfe2(Va - Vce1 - Vbe2)}{R2 + R0 \times hfe2} \quad \text{Eq 6}$$

For example, the shunt resistor R0 is approximately 3.3 MΩ. The resistor R2 is approximately 10 MΩ. The current amplification factor hfe2 is approximately 50. The emitter-collector voltage Vce1 is approximately 0.3 V. The base emitter voltage Vbe2 is approximately 0.6 V. The charging voltage Vpr is approximately −1000 V. The regulated voltage Va is approximately +24 V. When these values are substituted into Equation 6, Vdc −35 V is obtained. Thus, the development voltage Vdc falls short of +24 V.

Because the base voltage Vb2 of the transistor Tr2 is low, the base current Ib2 of the transistor Tr2 is low and the transistor Tr2 is not sufficiently saturated. As a result, the development voltage Vdc becomes −35 V. −35 V is lower than the 0 V surface voltage of the photosensitive drum 11. Thus, the toner t adheres to the photosensitive drum 11.

By adjusting the shunt resistor R0, the resistor R2, and a current amplification factor hfe, the development voltage Vdc can be brought close to the regulated voltage Va (+24 V). However, more is needed to achieve a positive voltage higher than the regulated voltage Va (+24 V) and to decrease the withstand voltage required for the transistors Tr1 and Tr2.

Adding a Boost Circuit

Figure 7:
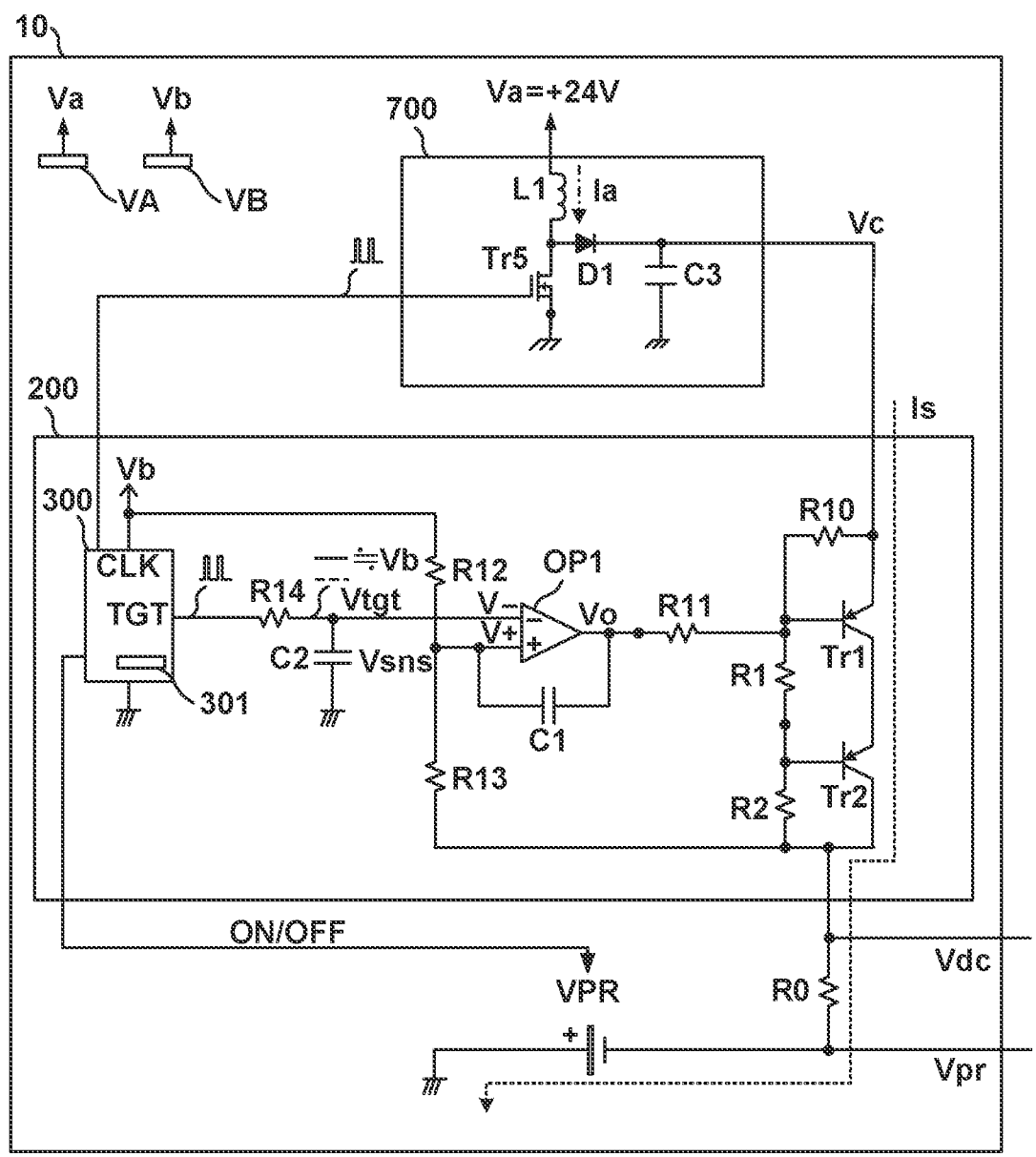
FIG. 7 is a circuit diagram for describing a power supply apparatus according to one embodiment.

FIG. 7 is a diagram illustrating the power supply apparatus 10 including a boost circuit 700. Components that are the same as that already described are given the same reference sign, and the description thereof is omitted. The boost circuit 700 boosts the regulated voltage Va supplied from a power supply VA to a voltage Vc. One end of a coil L1 is connected to the power supply VA for supplying the regulated voltage Va. Note that a power supply VB is a power supply circuit for generating a voltage Vb.

The other end of the coil L1 is connected to the drain of a MOS (metal-oxide-semiconductor) transistor Tr5. The gate of the transistor Tr5 is connected to the CPU 300, and here a clock signal CLK is input. The source of the transistor Tr5 is connected to a ground. The transistor Tr5 operates by switching in accordance with the clock signal CLK, and the voltage applied to the coil L1 is boosted. The other end of the coil L1 is also connected to the anode of a diode D1. This rectifies a current Ia. The cathode of the diode D1 is connected to one end of a capacitor C3 and the emitter of the transistor Tr1. The other end of the capacitor C3 is connected to a ground. The current Ia is smoothed by the capacitor C3. The voltage across both ends of the capacitor C3 corresponds to the voltage Vc. In other words, the regulated voltage Va is boosted to the voltage Vc. The voltage Vc is a voltage (for example, +150 V) sufficient enough to inhibit adhesion of the toner t.

Timing Chart

Figure 8:
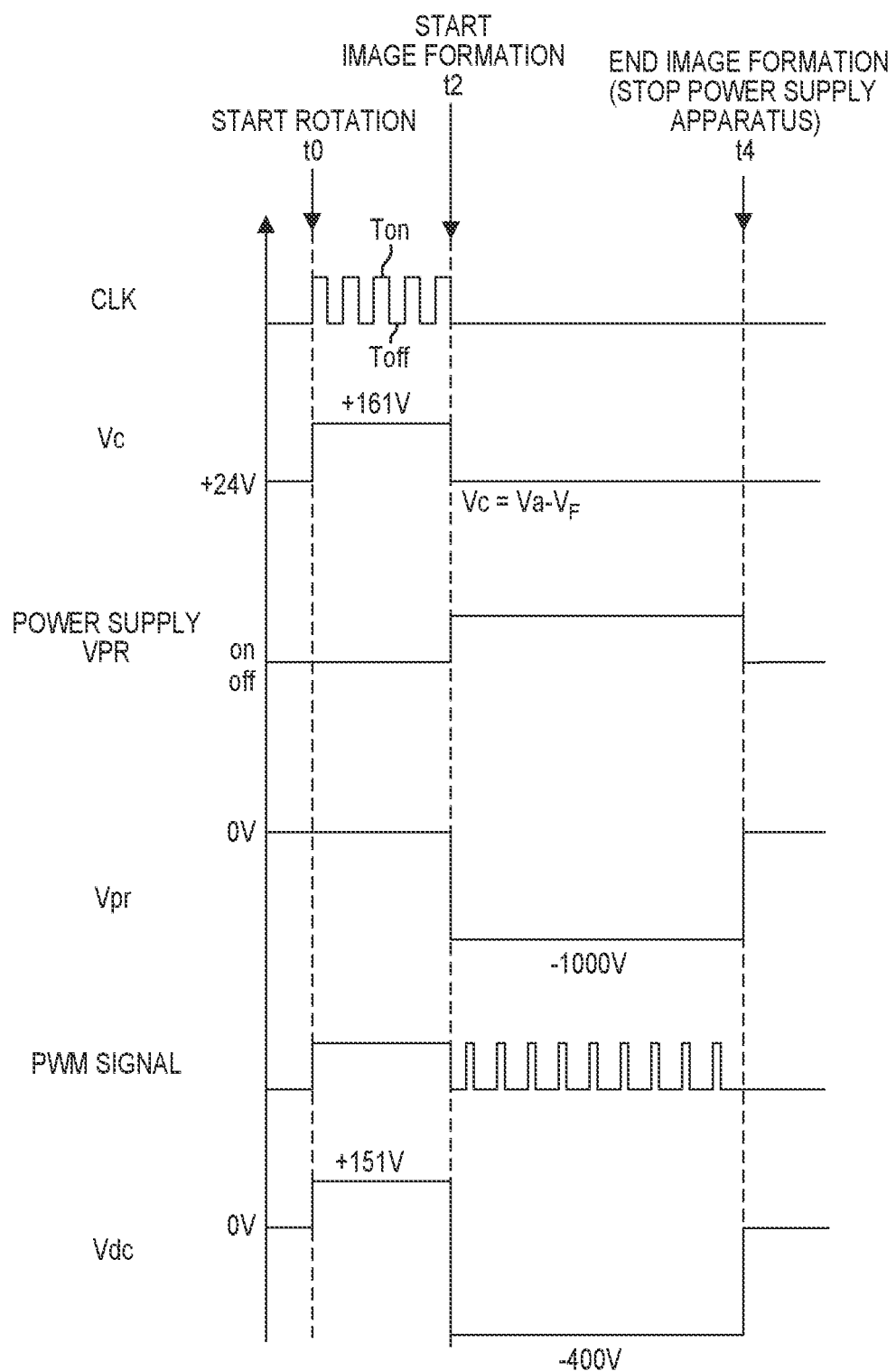
FIG. 8 is a timing chart for describing the relationship between control signals and voltages according to one embodiment.

FIG. 8 is a diagram illustrating the change over time in voltages and signals in the power supply apparatus 10. At time t0, the motor M1 starts, and the photosensitive drum 11 starts rotating. The CPU 300 starts outputting the clock signal CLK to the transistor Tr5 of the boost circuit 700. In this example, the regulated voltage Va is +24 V. In a period Ton in which the transistor Tr5 is switched on by the clock signal CLK, the current Ia flowing through an inductance L1 of a coil is expressed by Equation 7.

$$Ia = \frac{Va}{L1} \times Ton \quad \text{Eq 7}$$

The current Ia flowing in a period Toff in which the transistor Tr5 is off is expressed by Equation 8.

$$Ia = \frac{(Vc - Va)}{L1} \times Toff \quad \text{Eq 8}$$

Following from Equation 7 and Equation 8, the voltage Vc, i.e., the output voltage of the boost circuit 700, is expressed by Equation 9.

$$Vc = \frac{(Ton + Toff)}{Toff} \times Va \quad \text{Eq 9}$$

Here, the period Ton of the clock signal CLK supplied to the transistor Tr5 is 4 usec, and the period Toff is approximately 0.7 usec. usec referred to microseconds. Accordingly, the voltage Vc becomes +161 V.

The CPU 300 starts outputting the clock signal CLK and sets the duty ratio of the PWM signal output from the output terminal TGT to the maximum value simultaneously and in parallel. In this manner, the PWM signal stays on. In other words, the PWM signal corresponds to the direct current voltage Vb. The set voltage Vtgt applied to the inverting input terminal V− of the operational amplifier OP1 is increased. As a result, the output voltage Vo of the operational amplifier OP1 becomes roughly 0 V.

The period from time t0 to time t2 is a type of preparation period. The CPU 300 keeps the control signal to the power supply VPR to off. Accordingly, in the preparation period, the power supply VPR for generating the charging voltage Vpr is kept to off. Thus, the charging voltage Vpr is 0 V.

Because the output voltage Vo in the preparation period is roughly 0 V, the base current Ib1 of the transistor Tr1 increases. Then, the transistor Tr1 is saturated, and the emitter-collector voltage Vce1 of the transistor Tr1 becomes roughly 0.3 V. Here, by substituting the voltage Va of Equation 6 for the voltage Vc, Equation 10 is obtained.

$$Vdc = \frac{R2 \times Vpr + R0 \times hfe2(Vc - Vce1 - Vbe2)}{R2 + R0 \times hfe2} \qquad \text{Eq 10}$$

In a case where the voltage Vc is +161 V, the development voltage Vdc is +151 V. Because the development voltage Vdc is sufficiently higher than the 0V surface voltage of the photosensitive drum 11, the toner t is inhibited from adhered to the photosensitive drum 11.

Image Formation Period

In FIG. 8, time t2 is the time when image formation starts. The period from time t2 to time t4 is the image formation period. In the image formation period, the photosensitive drum 11 is irradiated with the laser beam X, the electrostatic latent image and the toner image are formed, and the toner image is transferred onto the sheet P.

At time t2, the CPU 300 switches the control signal to the power supply VPR from off to on. This starts the power supply VPR, and the power supply VPR starts outputting the charging voltage Vpr. The power supply VPR may be implemented via a Cockroft-Walton circuit often used in high voltage power supply. The power supply VPR is required to be a power supply circuit with variable output voltage such as a Cockroft-Walton circuit. The charging voltage Vpr is approximately −1000 V.

The output of the boost circuit 700 is connected to the emitter of the transistor Tr1. The shunt resistor R0 and the power supply VPR are connected to the collector of the transistor Tr2. Thus, the shunt current Is flows in order from the boost circuit 700, the transistor Tr1, the transistor Tr2, the shunt resistor R0, the power supply VPR, then a ground. As in Equation 1, by appropriately increasing or decreasing the magnitude of the shunt current Is, the development voltage Vdc is adjusted.

The memory 301 stores a table listing the relationships between the duty ratio (set voltage Vtgt) of the PWM signal output from the output terminal TGT and the development voltage Vdc. The CPU 300 references the table and determines the duty ratio needed to achieve an appropriate development voltage Vdc. At time t2, the CPU 300 decreases the duty ratio of the PWM signal and adjusts the development voltage Vdc to −400 V.

If the voltage Vc stays at +161 V and the development voltage Vdc is decreased to −400 V, the 561 V voltage across the emitter of the transistor Tr1 and the collector of the transistor Tr2 will be applied. In a case where the withstand voltage across the collector emitter of the transistor Tr1 and the voltage across the collector emitter of the transistor Tr2 are 250 V, this would cause the collector emitter voltage to exceed the withstand voltage.

Thus here, at time t2, the CPU 300 stops the boosting by the boost circuit 700 by stopping the output of the clock signal CLK. In this manner, the voltage Vc becomes a voltage (+23.4 V) equal to the regulated voltage Va (+24 V) minus a forward voltage $V_F$ (approximately 0.6 V) of the diode D1. In other words, the voltage Vc (+23.4 V) is roughly equal to the regulated voltage Va. When the voltage Vc is +24 V, the voltage across the emitter of the transistor Tr1 and the collector of the transistor Tr2 becomes 424 V. Thus, the voltage across the emitter of the transistor Tr1 and the collector of the transistor Tr2 is less than the withstand voltage of 500 V (2×250 V). That is, even in a case where the boost circuit 700 is used, the transistors Tr1 and Tr2 with a low withstand voltage can still be used.

Image Formation End

Image formation ends at time t4. The CPU 300 switches the control signal to the power supply VPR from on to off, stopping the power supply VPR. Accordingly, the charging voltage Vpr becomes 0 V. The CPU 300 stops the output of the PWM signal from the output terminal TGT. Accordingly, the output voltage Vo of the operational amplifier OP1 becomes a roughly Hi (open) level. As a result, the base current Ib1 of the transistor Tr1 decreases, and the transistor Tr1 transitions to a non-saturated state. This makes the voltage Vc stop contributing the development voltage Vdc.

In this manner, by introducing the boost circuit 700, just after the photosensitive drum 11 starts rotating, the development voltage Vdc is controlled to +150 V, which is sufficiently higher than the regulated voltage Va of +24 V. This inhibits the toner t from adhering to the photosensitive drum 11 and helps prevent the back surface of the sheet P being marked. Furthermore, in the image formation period, the boost circuit 700 is off. Thus, the voltage across the emitter of the transistor Tr1 and the collector of the transistor Tr2 does not exceed the withstand voltage.

Example 2

In Example 1, when image formation is started, the power supply VPR is also started and the duty ratio of the PWM signal is decreased. As a result, the development voltage Vdc is controlled to −400 V. However, even after controlling the charging voltage Vpr to −1000 V, the charge on the surface of the charging roller 12 is not immediately charged. The charge gradually stabilizes over a certain time constant. Thus, just after the power supply VPR activates, the charging voltage Vpr applied to the charging roller 12 is not sufficient. The development voltage Vdc applied to the developing roller 15 is also low, meaning that the toner t may adhere to the photosensitive drum 11. Here, in Example 2, by gradually decreasing the charging voltage Vpr, the development voltage Vdc is decreased in steps to the target voltage.

Switching Preparation Period

Figure 9:
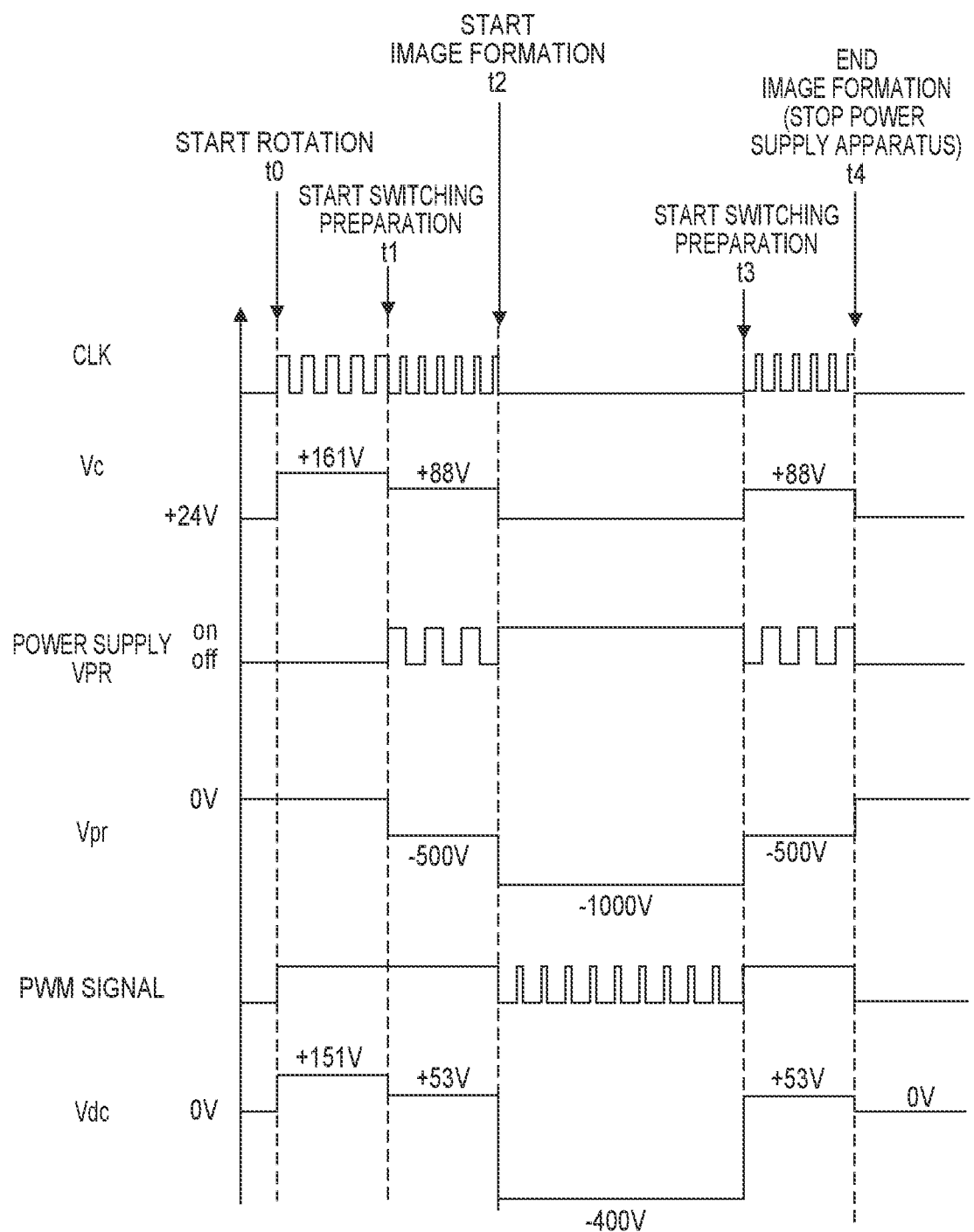
FIG. 9 is a timing chart for describing the relationship between control signals and voltages according to one embodiment.

FIG. 9 is a timing chart illustrating Example 2. Items common to both FIG. 9 and FIG. 8 are given the same reference sign and the description thereof is incorporated herein. As illustrated in FIG. 9, the preparation period from time t0 to time t2 is divided into two sub-periods. The sub-period from time t0 to time t1 may be referred to as a first preparation period. The sub-period from time t1 to time t2 may be referred to as a second preparation period.

At time t0, the CPU 300 starts the output of the PWM signal as well as starting the output of the clock signal CLK of a first duty ratio. The period Ton of the clock signal CLK is 4 usec, and the period Toff is approximately 0.7 usec. Accordingly, the voltage Vc is controlled to +161 V. Also, the transistors Tr1 and Tr2 are switched to on by the PWM signal. However, the power supply VPR is kept off, and the charging voltage Vpr is 0 V. Accordingly, the development voltage Vdc becomes +151 V.

At time t1, the CPU 300 decreases the duty ratio of the clock signal CLK from the first duty ratio to a second duty ratio. For example, the period Ton is approximately 4 usec, and the period Toff is approximately 1.5 usec. According to this condition, using Equation 9, +88 V is obtained for the voltage Vc.

At time t1, the CPU 300 activates the power supply VPR and starts the output of the charging voltage Vpr. The charging voltage Vpr is approximately −500 V. At time t1, the CPU 300 starts the output of the PWM signal. This makes the output voltage Vo of the operational amplifier OP1 roughly 0 V. The base current Ib1 of the transistor Tr1 increases, saturating the transistor Tr1. The voltage Vc is +88 V, and the charging voltage Vpr is −500 V. Thus, using Equation 10, the development voltage Vdc is calculated to be +53 V. Accordingly, the voltage across the emitter of the transistor Tr1 and the collector of the transistor Tr2 becomes 35 V (the difference between +88 V and +53 V). Because the voltage is lower than the withstand voltage of the transistors Tr1 and Tr2, the transistors Tr1 and Tr2 are protected.

However, as in Example 1, in a case where the power supply VPR is started in advance, the shunt resistor R0 also needs a high withstand voltage (for example, 1600 V). This is because in a case where the charging voltage Vpr is −1000 V, the development voltage Vdc becomes +151 V. In Example 2, the withstand voltage of the shunt resistor R0 should be 600 V or less. This is because when the development voltage Vdc is +53 V and the charging voltage Vpr is −500 V, the necessary withstand voltage is 553 V. This allows the withstand voltage needed for the shunt resistor R0 to be kept low.

As illustrated in FIG. 9, the switching preparation period for ending image formation is provided from time t3 to time t4. Note that the actual image formation (development of the electrostatic latent image) ends at time t3. In other words, time t4 can be understood as the stopping period of the power supply apparatus 10. The method for controlling the signals and the voltages in the period from time t3 to time t4 is the same as the method for controlling the signals and the voltages in the period from time t1 to time t3. Accordingly, the output of the charging voltage Vpr, the voltage Vc, and the development voltage Vdc can be stopped without the transistors Tr1 and Tr2 or the shunt resistor R0 failing.

Before development starts and after development ends, the charging voltage Vpr, the voltage Vc, and the development voltage Vdc are (gradually) changed in steps. This helps prevent the back surface of the sheet P being marked. Furthermore, the transistors Tr1 and Tr2 and the shunt resistor R0 are protected from a high voltage. This allows low-cost electric circuit elements with a low withstand voltage to be used for the transistors Tr1 and Tr2 and the shunt resistor R0.

Technical Ideas Derived from Examples 1 and 2

A power supply apparatus for an image forming apparatus is used in the examples described above. However, the technical concepts of the present disclosure can be applied to any power supply apparatus that needs to change the polarity of an output voltage. In other words, the technical concepts of the present disclosure can also be applied to a power supply apparatus for an electronic device other than an image forming apparatus.

The boost circuit 700 is an example of a boost circuit for boosting the voltage (for example, +24 V) supplied from a reference voltage source (for example, Va) and generating a first power supply voltage (for example, Vc). The CPU 300 is an example of a boost control unit for controlling switching the boost circuit on and off. The transistor Tr1 is an example of a first transistor with the emitter connected to the first power supply voltage. In other words, the first power supply voltage is applied to the emitter of the transistor Tr1. The transistor Tr2 is an example of a second transistor with the emitter connected to the first transistor. The shunt resistor R0 is an example of a resistance element with one end connected to the collector of the second transistor. The power supply VPR is an example of a voltage source connected to the other end of the resistance element for generating a second power supply voltage with the opposite polarity to the polarity of the first power supply voltage. The power supply apparatus 10 controls the collector voltage of the second transistor, i.e., an output voltage, by controlling the amount of the base current of the first transistor. This allows the voltage to be effectively switched between positive and negative with a simple configuration.

In a case where the collector voltage of the second transistor is controlled to be output with the same polarity as the polarity of the first power supply voltage, the CPU 300 may switch the boost circuit to on. In a case where the collector voltage of the second transistor is controlled to be output with the opposite polarity to the polarity of the first power supply voltage and the same polarity as the polarity of the second power supply voltage, the CPU 300 may switch the boost circuit to off.

As illustrated in FIG. 1, the photosensitive drum 11 is an example of a photosensitive member. The motor M1 is an example of a motor for rotating the photosensitive member by driving the photosensitive member. The charging roller 12 is an example of a charging unit for applying a charging voltage and uniformly charging the surface of the photosensitive member. The charging unit may be a member other than a roller. The exposure apparatus 13 is an example of a light source for irradiating the photosensitive member with light and forming an electrostatic latent image. The developing roller 15 is an example of a developing unit for applying the development voltage Vdc, adhering toner on the electrostatic latent image, and forming the toner image. The transfer roller 16 is an example of a transfer unit for transferring the toner image onto an intermediate transfer member or the sheet P. The transfer roller 16 may be a member (for example, a blade) other than a roller. The power supply apparatus 10 is an example of a power supply apparatus for generating the charging voltage and the development voltage. The CPU 300 is an example of a power supply control unit for controlling the power supply apparatus 10. Control by the CPU 300 may include both boost control and power supply control. The period from a first time (for example, time t0) when the photosensitive member starts rotating to a second time (for example, time t2) when the light source forms an electrostatic latent image may be referred to as the preparation period. The power supply control unit (CPU 300), in the preparation period, controls the power supply apparatus 10 so that the development voltage becomes an inhibiting voltage (for example, +150 V or higher) for inhibiting movement of the toner from the developing unit to the photosensitive member. This reduces the likelihood of unintentional marking of the sheet P with the toner t.

The control unit (CPU 300) performs controls to invert the polarity (for example, positive) of the development voltage in the preparation period with respect to the polarity (for example, negative) of the development voltage in the image formation period, which is the period after the second time. This helps prevent the toner t unintentionally adhering to the photosensitive drum 11 in the preparation period.

As illustrated in FIG. 9, the control unit (CPU 300) may decrease the development voltage in two steps or more in the preparation period. Here, two steps are just an example, and the control step of the development voltage may include a plurality of steps (for example, three steps or more). The control unit (CPU 300) may perform control so that the development voltage becomes a first inhibiting voltage (for example, +161 V) in a first period of the preparation period. The control unit (CPU 300) may perform control so that the development voltage becomes a second inhibiting voltage (for example, +88 V) lower than the first inhibiting voltage in a second period of the preparation period after the first period. This even more reliably reduces the likelihood of the back surface of the sheet P being marked with the toner t.

As illustrated in FIG. 9, the period from time t3 to time t4 is an example of a reserve period after image formation starts and before image formation ends. The control unit (CPU 300) may control the power supply apparatus 10 so that the development voltage returns to the inhibiting voltage (for example, +88 V) in the reserve period. Note that the polarity of the inhibiting voltage may be the opposite of the polarity (regular polarity) of the toner. For example, if the regular polarity of the toner is negative, the polarity of the inhibiting voltage is positive. For example, the control unit (CPU 300) may control the power supply apparatus 10 so that the development voltage returns to the second inhibiting voltage (for example, +88 V) in the reserve period.

As illustrated in FIG. 7, the power supply apparatus 10 may include the boost circuit 700 for performing control so that the development voltage becomes the inhibiting voltage in the preparation period. Typically, the boost circuit 700 can be implemented with a simple circuit. Thus, the inhibiting voltage can be generated at a low cost. Note that, instead of the boost circuit 700, a power supply circuit capable of outputting +24 V, a power supply circuit capable of outputting +161 V, and a switch circuit for switching between the two power supply circuits may be used. The CPU 300 may select one voltage from the +24 V and the +161 V by a switch signal being supplied to the switch circuit.

As illustrated in FIGS. 8 and 9, the control unit (CPU 300) may adjust the development voltage in the preparation period by controlling the boost circuit 700. For example, the development voltage Vdc may be adjusted by stopping the boost circuit 700 or operating the boost circuit 700. Also, the value of the voltage Vc that influences the development voltage Vdc may be adjusted by adjusting the duty ratio of the drive signal (for example, CLK) input to the boost circuit 700.

As illustrated in FIG. 7, the power supply VA is an example of a first power supply for supplying the first power supply voltage (for example, the regulated voltage Va) to the boost circuit. The bias circuit 200 is an example of a current control circuit for controlling the current (for example, the shunt current Is) connected to the boost circuit. The shunt resistor R0 is an example of a voltage generating circuit for generating a development voltage according to the current supplied from the current control circuit. The power supply VPR is an example of a second power supply for supplying the second power supply voltage Vpr to the voltage generating circuit. The control unit (CPU 300) may adjust the development voltage by controlling the current passing through the current control circuit. This allows the development voltage Vdc to be adjusted using a relatively simple circuit.

As illustrated in FIG. 7, the boost circuit 700 may include a coil (for example, L1) connected to the first power supply, a switching element (for example, Tr5) connected to the coil, and a rectification and smoothing circuit (for example, D1, C3) for rectifying and smoothing the current generated in the coil. The control unit (CPU 300) adjusts the voltage Vc applied to the current control circuit from the boost circuit by controlling the switching element. In this manner, the current (for example, the shunt current Is) flowing from the current control circuit to the voltage generating circuit may be adjusted. This allows the shunt current Is to be controlled using a simple circuit configuration.

The voltage generating circuit may be a conversion circuit for converting the current supplied from the current control circuit into voltage. As illustrated in FIG. 7, the conversion circuit may include a resistor (for example, the shunt resistor R0) with one end connected to the current control circuit and the other end connected to the second power supply.

As described using FIG. 3 and the like, the current control circuit may adjust the current flowing through the voltage generating circuit in accordance with a control signal (for example, the PWM signal) supplied from the control unit. In this manner, the development voltage Vdc may be adjusted.

The current control circuit may include a transistor (for example, Tr1, Tr2, and Tr3). The emitter of a transistor (for example, Tr1) may be connected to the output of the boost circuit. The collector of a transistor (for example, Tr2 and Tr3) may be connected to the voltage generating circuit. The control unit (CPU 300) may adjust the current flowing from the emitter to the collector by supplying a control signal to a transistor (for example, Tr1).

The current control circuit may include a first transistor (for example, Tr1) and a second transistor (for example, Tr2). The emitter of the first transistor may be connected to the output of the boost circuit. The collector of the first transistor may be connected to the emitter of the second transistor. The collector of the second transistor may be connected to the voltage generating circuit. The control unit (CPU 300) may adjust the current flowing from the emitter of the first transistor to the second transistor by supplying a control signal to the first transistor (and the second transistor).

When the second power supply increases the output voltage, the control unit (CPU 300) decreases the voltage supplied from the boost circuit. Accordingly, the voltage across between the emitter and the collector of the first transistor does not exceed the withstand voltage of the first transistor, and the voltage applied across the emitter and the collector of the second transistor does not exceed the withstand voltage of the second transistor. Accordingly, even lower-cost transistors with a low withstand voltage can be used.

The resistors R12 and R13 function as detection circuits for detecting the development voltage and detecting the detected voltage. The operational amplifier OP1 functions as a comparison circuit for outputting, as a control signal, the voltage according to the comparison result of the set voltage according to the target value of the development voltage and the detected voltage. The control unit (CPU 300) may adjust the development voltage by adjusting the set voltage. The resistor R14 and the capacitor C2 function as a smoothing circuit for smoothing the rectangular waves output from the control unit and generating the set voltage.

The control unit may, simultaneously and in parallel, control the voltage (for example, Is×R0) generated at the voltage generating circuit on the basis of the current generated according to the voltage output from the boost circuit and the voltage (for example, Vpr) supplied from the second power supply. This reduces the withstand voltage needed for the voltage generating circuit (for example, shunt resistor R0).

As illustrated in FIG. 9, the voltage output from the boost circuit may be a voltage with a first polarity. The voltage supplied from the second power supply may be a voltage with a second polarity the opposite of the first polarity. The control unit (CPU 300), in the preparation period (for example, t0 to t2), may gradually decrease the voltage output from the boost circuit and gradually increase the voltage output from the second power supply. This reduces the withstand voltage needed for the electric circuit element.

The control unit (CPU 300), in the reserve period (for example, t3 to t4), may increase the voltage output from the boost circuit and decrease the voltage output from the second power supply. This reduces the withstand voltage needed for the electric circuit element.

The voltage output from the second power supply may be the charging voltage Vpr. Accordingly, a common power supply VPR for generating the charging voltage Vpr and the development voltage Vdc can be used.

According to Examples 1 and 2, the power supply apparatus 10 is provided. As described in Perspectives 8 and 9, the power supply apparatus 10 includes a boost circuit, a first power supply, a current control circuit, a voltage generating circuit, a second power supply, and a control unit. The control unit (CPU 300) may control the boost circuit, the current control circuit, and the second power supply. As illustrated in FIGS. 8 and 9, there is the preparation period, which is the period from a first time when the photosensitive member starts rotating to a second time when the light source forms an electrostatic latent image. The control unit (CPU 300) may control the boost circuit, the current control circuit, and the second power supply so that, in the preparation period, the development voltage becomes an inhibiting voltage for inhibiting the toner from moving from the developing unit to the photosensitive member.

Example 3

The developing apparatus develops the electrostatic latent image and forms a toner image using toner. The developing apparatus includes a developing roller (sleeve) provided opposite a photosensitive drum and a supplying roller provided opposite the developing roller for supplying toner to the developing roller. Toner from the supplying roller adheres to the developing roller because of the potential difference between the developing roller and the supplying roller. The resistance value between the supplying roller and the developing roller is expected to be uniform. However, actually, non-uniform adhesion of the toner may cause a portion between the supplying roller and the developing roller to have a localized portion with a low resistance value. A large amount of current flows in the portion with a low resistance value, shortening the service life of the roller. This is more problematic in cases where an ion conductive member is used as the surface member of the rollers. This is because, when a large amount of current flows, electrolysis of the ion conductive member proceeds, as does wear of the ion conductive member. As a result, there may be density non-uniformity in the toner image. Also, an adhesion prevention voltage may be applied to the developing roller to help prevent toner adhering to the back surface of the sheet and the back surface being marked. Because this increases the potential difference described above, measures need to be put in place to protect the roller surface.

Image Forming Unit 7

Figure 10:
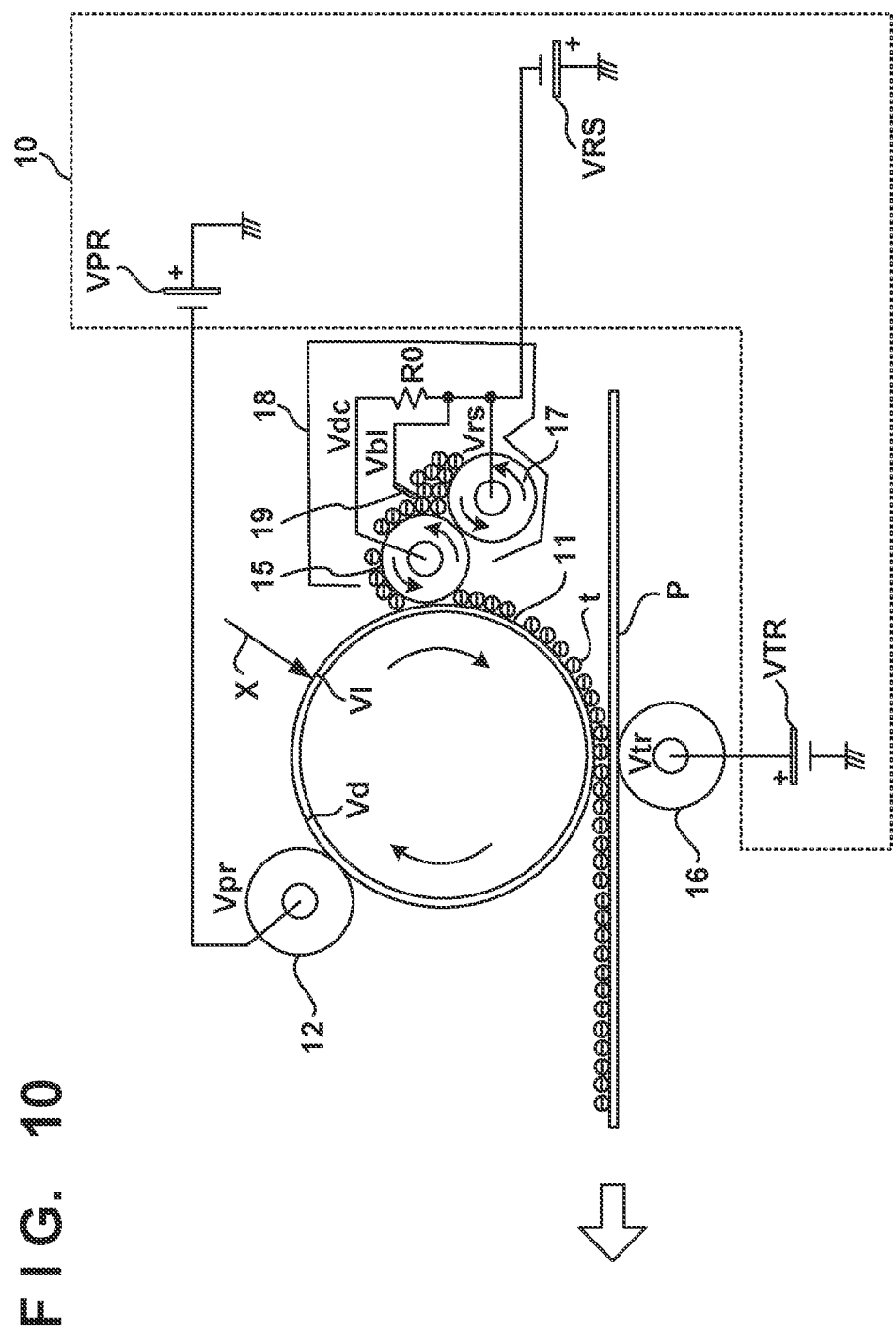
FIG. 10 is a schematic cross-sectional view of an image forming unit according to one embodiment.

FIG. 10 is a cross-sectional view of an image forming unit. The power supply apparatus 10 includes the charging power supply VPR, a developing power supply VRS, and the transferring power supply VTR. The charging power supply VPR generates the charging voltage Vpr and applies this to the charging roller 12. The charging voltage Vpr is approximately −1000 V, for example. The charging roller 12 charges the surface potential of the photosensitive drum 11 to the dark area potential Vd. The dark area potential Vd is approximately −700 V, for example. The photosensitive drum 11 rotates in the clockwise direction and is irradiated with the laser beam X. The surface potential of the photosensitive drum 11 is changed to the light area potential Vl by being irradiated with the laser beam X. The light area potential Vl is approximately −100 V, for example. The development voltage Vdc generated by the developing power supply VRS and the resistor R0 is applied to the developing roller 15. The resistor R0 is the shunt resistor. The development voltage Vdc is approximately −400 V, for example. Inside a developing apparatus 18, a supplying roller 17 is disposed opposite the developing roller 15 and in contact with the developing roller 15. The rotation direction of the developing roller 15 and the rotation direction of the supplying roller 17 are opposite directions. A toner supply bias Vrs is applied to the supplying roller 17. The toner supply bias Vrs is approximately −600 V, for example. In a case where the development voltage Vdc is higher than the toner supply bias Vrs, the toner t, which is a powder with a negative charge, adheres to the surface of the developing roller 15. A blade 19 is in contact with the developing roller 15. The blade 19 is connected in parallel with the supplying roller 17 and is applied with the toner supply bias Vrs (blade bias Vb1). The blade 19 regulates the thickness of the layer of the toner t that adheres to the developing roller 15 and charges the toner t. In this manner, the supplying roller 17 and the blade 19 supply an appropriate amount of the toner t from the toner cartridge of the developing apparatus 18 to the developing roller 15. When the photosensitive drum 11 rotates further, the electrostatic latent image comes into contact with the developing roller 15. By supplying the toner t from the supplying roller 17, the toner t adheres around the developing roller 15. In a case where the light area potential Vl (for example, −100 V) is higher than the development voltage Vdc (for example, −400 V), the toner t adheres to the surface (electrostatic latent image) of the photosensitive drum 11. In this manner, the toner image is formed. When the photosensitive drum 11 rotates further, the toner image arrives at a transfer nip formed by the photosensitive drum 11 and the transfer roller 16. At the transfer nip, the toner image is transferred on a first surface (front surface) of the sheet P. The transfer voltage Vtr is applied to the transfer roller 16 from the transferring power supply VTR. The transfer voltage Vtr is approximately +1000 V, for example. Because the transfer voltage Vtr (for example, +1000 V) is higher than the light area potential Vl (for example, −100 V), the toner t separates from the photosensitive drum 11 and adheres on the sheet P.

Toner Marking Measures

As illustrated in FIG. 11, when the photosensitive drum 11 starts rotating, it reaches the developing roller 15 with the surface potential of a sector portion 14 being unchanged at 0 V. In a case where the development voltage Vdc is a (negative) potential less than 0 V, the toner t adheres to the photosensitive drum 11. As illustrated in FIG. 11, the photosensitive drum 11 carries the toner t to the transfer roller 16, and the toner t adheres to the transfer roller 16. When the sheet P arrives at the transfer nip, the toner t adheres to a second surface (back surface) of the sheet P from the transfer roller 16, marking the sheet P.

Here, as illustrated in FIG. 12, the bias circuit 200 applies the development voltage Vdc with a positive polarity to the developing roller 15 so that the potential of the developing roller 15 when the photosensitive drum 11 starts rotating is higher than 0 V. Note that the bias circuit 200 is supplied with a reference voltage Va from a reference voltage source VA and generates the development voltage Vdc with a positive polarity. This helps prevent the toner t from adhering to the photosensitive drum 11 from the developing roller 15.

In this manner, the power supply apparatus 10 includes a power supply for generating the development voltage Vdc with a negative polarity and a power supply for generating the development voltage Vdc with a positive polarity. Accordingly, good development performance can be achieved, and the likelihood of the sheet P being marked with toner can be decreased.

Bias Circuit

Figure 13:
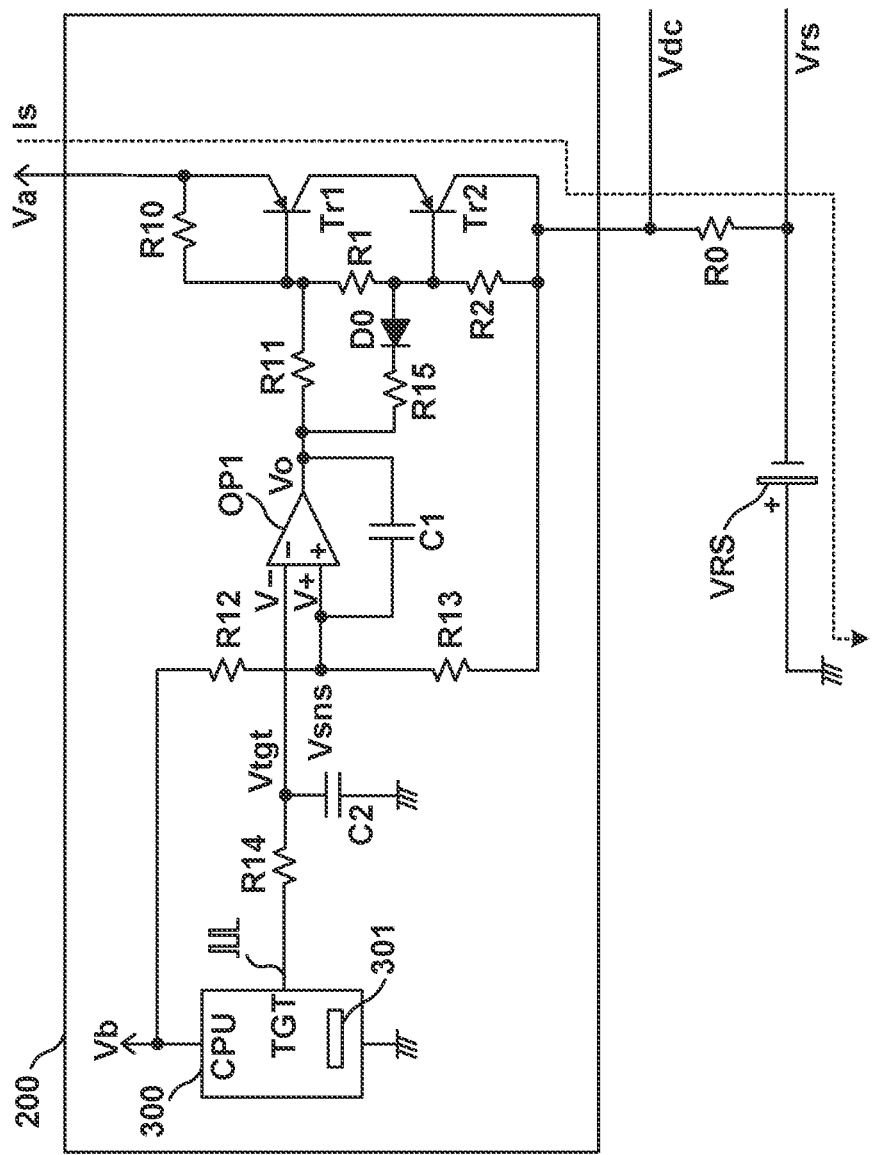
FIG. 13 is a circuit diagram of a portion of a power supply apparatus according to one embodiment.

FIG. 13 is a diagram illustrating the bias circuit 200. The regulated voltage Va (for example, +24 V) is supplied from the reference voltage source VA inside the power supply apparatus 10. The emitter of the transistor Tr1 applies the regulated voltage Va. The collector of the transistor Tr1 is connected to the emitter of a transistor Tr2. The collector of the transistor Tr2 is connected to one end of the resistor R0 and the developing roller 15. The other end of the resistor R0 is connected to the blade 19 and the negative terminal of the supplying roller 17 and the developing power supply VRS. The CPU 300 is a central processing unit for controlling the power supply apparatus 10 and may be installed outside of the bias circuit 200. The CPU 300 is supplied with a regulated voltage Vb (for example, +3.3 V) from the power supply circuit of the power supply apparatus 10. The CPU 300 outputs a PWM signal for setting the development voltage Vdc to a target voltage from the output terminal TGT. PWM stands for pulse width modulation. A PWM signal is a type of rectangular wave. The CPU 300 sets the target voltage by adjusting the duty ratio of the PWM signal. The PWM signal is smoothed by a smoothing circuit formed by the resistor R14 and the capacitor C2, and is converted to the set voltage Vtgt. The set voltage Vtgt is a voltage proportional to the target voltage. The set voltage Vtgt is input to the inverting input terminal V− of the operational amplifier OP1. The detected voltage Vsns proportional to the development voltage Vdc is input to the non-inverting input terminal V+ of the operational amplifier OP1. The resistors R12 and R13 form a voltage divider circuit. The development voltage Vdc is divided by the voltage divider circuit and converted into the detected voltage Vsns proportional to the development voltage Vdc. The capacitor C1 is connected between the non-inverting input terminal V+ and the output terminal of the operational amplifier OP1. The output terminal of the operational amplifier OP1 is connected to the base of the transistor Tr1 via the current limiting resistor R11. The resistor R10 for malfunction prevention is connected between the emitter base of the transistor Tr1. The resistors R1 and R2 are connected in series and form a voltage divider circuit. The resistance value of the resistor R1 and the resistance value of the resistor R2 may be the same. The voltage divider circuit is connected between the base of the transistor Tr1 and the output terminal of the development voltage Vdc. Thus, a voltage proportional to the development voltage Vdc is applied to the base of the transistor Tr2. Note that the output terminal of the operational amplifier OP1 is connected to the base of the transistor Tr2 via a resistor R15 and a diode D0. In other words, the output terminal of the operational amplifier OP1 is connected to one end of the resistor R15. The other end of the resistor R15 is connected to the cathode of the diode D0. The anode of the diode D0 is connected to the base of the transistor Tr2.

As illustrated in FIG. 13, the shunt current Is flows from the reference voltage source VA to the ground via the bias circuit 200. When the transistors Tr1 and Tr2 are switched on, the shunt current Is flows to the resistor R0 via the transistors Tr1 and Tr2. The CPU 300 controls the development voltage Vdc by appropriately increasing or decreasing the magnitude of the shunt current Is.

$$Vdc = Vrs + R0 \times Is \qquad \text{Eq11}$$

Here, in a case where the detected voltage Vsns is higher than the set voltage Vtgt, an output voltage Vo of the operational amplifier OP1 increases. Accordingly, the base current of the transistor Tr1 decreases, and the collector current (shunt current Is) of the transistor Tr1 decreases. When the shunt current Is decreases, as per Formula Eq11, the development voltage Vdc decreases. As a result, the detected voltage Vsns also decreases.

On the other hand, in a case where the detected voltage Vsns is lower than the set voltage Vtgt, the output voltage Vo decreases. Accordingly, the base current of the transistor Tr1 increases, and the collector current (shunt current Is) of the transistor Tr1 increases. When the shunt current Is increases, as per Formula Eq11, the development voltage Vdc increases, and the detected voltage Vsns also increases. In this manner, a negative feedback is applied to the operational amplifier OP1, and the detected voltage Vsns becomes equal to the set voltage Vtgt. As a result, the development voltage Vdc is maintained at the target voltage.

The memory 301 may, in advance, store a table listing the relationships between the duty ratio (i.e., set voltage Vtgt) of the PWM signal and the development voltage Vdc. The CPU 300 determines the set voltage Vtgt (i.e., the duty ratio of the PWM signal) corresponding to the target voltage of the development voltage Vdc by referencing the table. Here, the higher the duty ratio (i.e., the set voltage Vtgt), the higher the development voltage Vdc.

The voltage applied to the base of the transistor Tr1 is a voltage equal to the regulated voltage Va minus the base emitter voltage of the transistor Tr1. The base emitter voltage is 0.6 V, for example, and is a very low voltage. Thus, the base emitter voltage may be considered to be substantially zero. Accordingly, the regulated voltage Va is applied to one end (the upper terminal in FIG. 13) of the resistor R2. The development voltage Vdc is applied to the other end (the lower terminal in FIG. 13) of the resistor R1. The base of the transistor Tr2 is connected to the voltage divider point of the resistors R1 and R2. Thus, a voltage between the regulated voltage Va and the development voltage Vdc is applied to the base of the transistor Tr2. As a result, the emitter-collector voltage of the transistor Tr1 becomes roughly equal to the emitter-collector voltage of the transistor Tr2. The development voltage Vdc with a negative polarity is generated in this manner.

On the other hand, the development voltage Vdc with a positive polarity is generated from the regulated voltage Va in accordance with the following sequence.

S1: The duty ratio of the PWM signal output from the output terminal TGT is set to maximum (constant, H level) by the CPU 300.
S2: The output voltage Vo of the operational amplifier OP1 becomes the minimum value (roughly 0 V).
S3: The base current Ib1 of the transistor Tr1 increases, saturating the transistor Tr1.
S4: The collector voltage Vc1 of the transistor Tr1 becomes Va−Vce1.

$$Vc1 = Va - Vce1 \qquad \text{Eq12}$$

S5: The base current Ib2 flows through the transistor Tr2, and the base voltage Vb2 of the transistor Tr2 is Vc1−Vbe2.

$$Vb2 = Vc1 - Vbe2 \qquad \text{Eq13}$$

S6: Equation 14 is obtained by eliminating Vc1 from Equation 2 and Equation 3.

$$Vb2 = Va - Vce1 - Vbe2 \qquad \text{Eq14}$$

Typically, Vce1 is approximately 0.3 V, and Vbe2 is approximately 0.6 V. The regulated voltage Va is approximately +24 V. By substituting these values into Equation 14, Vb2≈23.1 V is obtained. Because the forward voltage is applied to the diode D0, the base current Ib2 flows in order from Tr2 to D0 to R15 and to OP1. The base current Ib2 is the base current of the transistor Tr2. Accordingly, the base current Ib2 of the transistor Tr2 increases, saturating the transistor Tr2.

S7: The development voltage Vdc at this time is expressed by the following Equation.

$$Vd = Va - Vce1 - Vce2 \qquad \text{Eq15}$$

Typically, a collector emitter voltage Vce of a transistor is approximately 0.3 V. Thus, Vce1 is approximately 0.3 V, and Vce2 is approximately 0.3 V. The regulated voltage Va is approximately +24 V. Thus, Vdc≈+23.4 V holds true, and this is applied to the developing roller 15 as a DC bias with positive polarity.

In this manner, even when the photosensitive drum 11 starts rotating and the region (0 V region) of the surface of the photosensitive drum 11 not charged with a negative polarity reaches the developing roller 15, the potential of the developing roller 15 is a positive polarity. This helps prevent toner adhesion.

Extending Roller Service Life

A member (ion conductive member) with ion conductivity may be used as the surface member of the developing roller 15 and the supplying roller 17. In this case, when there is a large potential difference between the developing roller 15 and the supplying roller 17, electrolysis occurs at both contact surfaces of the developing roller 15 and the supplying roller 17. As a result, the service life of the developing roller 15 and the service life of the supplying roller 17 may be shortened. Also, in a case where the developing roller 15 and the supplying roller 17 are used when they are at the end of their service life, the development performance is lower than expected from their design, and density non-uniformity and the like may be caused at a portion of the toner image. The operation state of the image forming apparatus 1 typically include a pre-rotation state, an image formation state, a post-rotation state, and a standby state. The pre-rotation state is an operation state in a period from when the photosensitive drum 11 starts rotating to when image formation can be performed. The image formation state is an operation state in which the photosensitive drum 11 forms a toner image according to an electrophotographic process. The post-rotation state is an operation state in which the toner remaining on the photosensitive drum 11 is cleaned off. The standby state is an operation state in which the photosensitive drum 11, the developing roller 15, and the supplying roller 17 are stopped. If the developing roller 15 and the supplying roller 17 are rotating, even if there is a large potential difference between the developing roller 15 and the supplying roller 17, the ion conductive member only wears slightly. However, in the standby state, because the developing roller 15 and the supplying roller 17 are stopped, the ion conductive member tends to wear quickly due to electrolysis. Thus, in particular, in the standby state, the potential difference between the developing roller 15 and the supplying roller 17 needs to be appropriately controlled.

Adding a Boost Circuit

Figure 14:
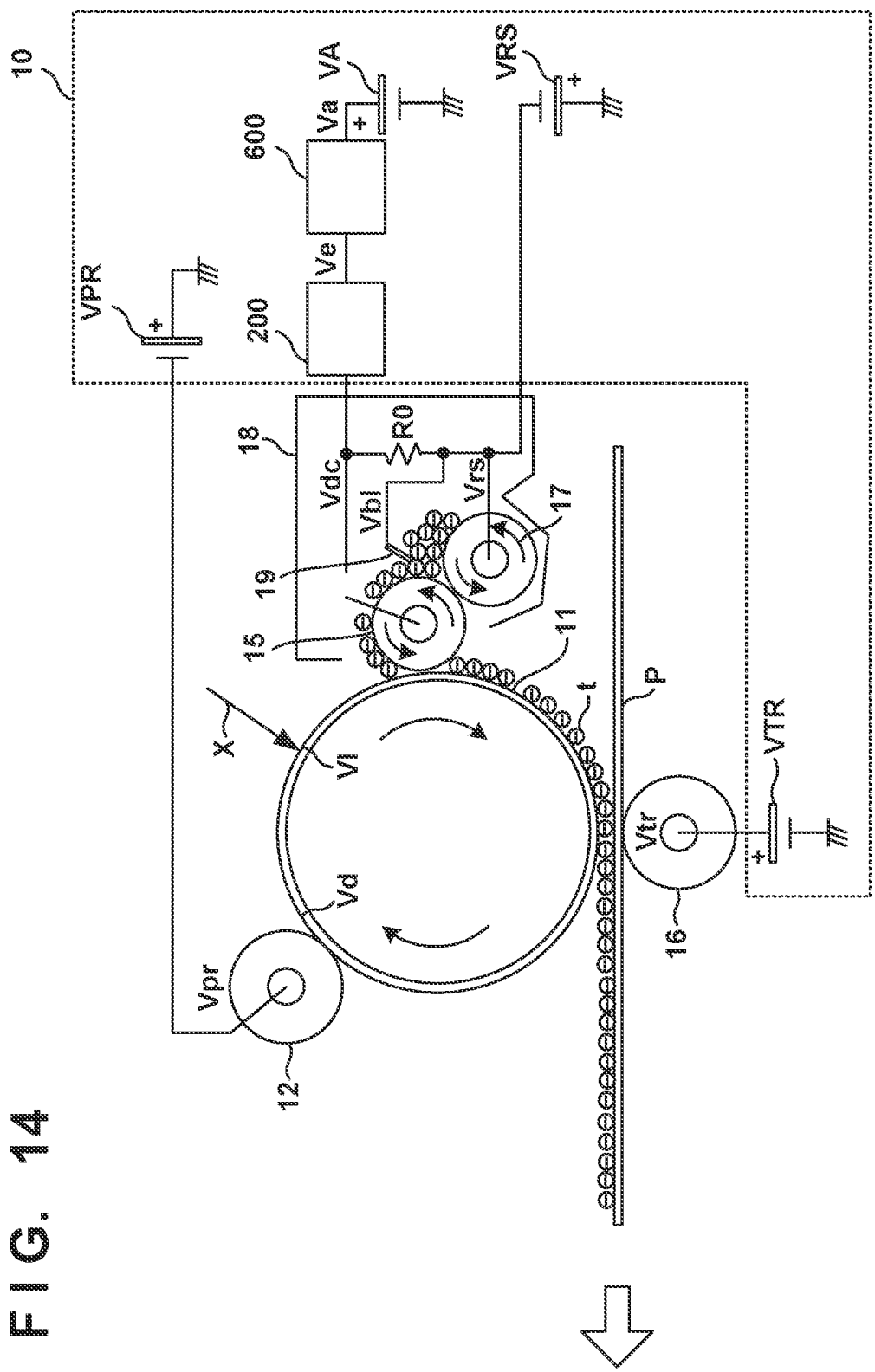
FIG. 14 is a diagram for describing a power supply apparatus according to one embodiment.

FIG. 14 is a diagram illustrating the power supply apparatus 10 further including a boost circuit 600 for reducing the likelihood of unnecessary toner adhesion. To effectively reduce the likelihood of unnecessary toner t adhering to the back surface of the sheet P, the development voltage Vdc is set to the highest voltage with a positive polarity. The boost circuit 600 boosts the regulated voltage Va (for example, +24 V) so that an output voltage Ve (for example, +150 V) higher than the regulated voltage Va is generated and supplies this to the bias circuit 200. Accordingly, the bias circuit 200 can generate the development voltage Vdc with a higher voltage and a positive polarity. From Equation 15, it can be seen that by using the higher output voltage Ve instead of the regulated voltage Va, the development voltage Vdc increases.

Figure 15:
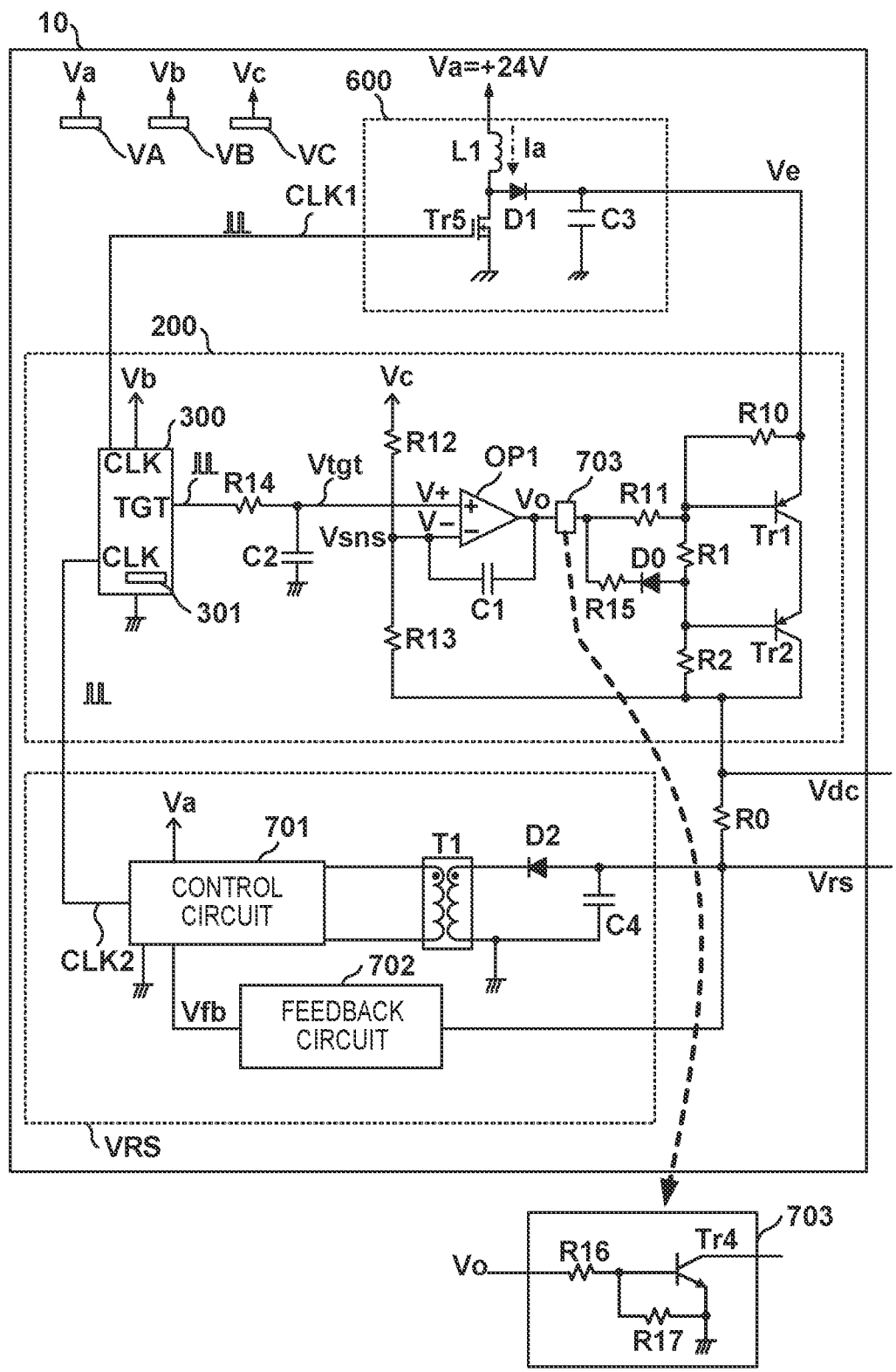
FIG. 15 is a circuit diagram of a portion of a power supply apparatus according to one embodiment.

FIG. 15 is a diagram illustrating the power supply apparatus 10 including the boost circuit 600. Components that are the same as that already described are given the same reference sign, and the description thereof is omitted. The boost circuit 600 boosts the regulated voltage Va supplied from the reference voltage source VA to the output voltage Ve. One end of a coil L1 is connected to the reference voltage source VA for supplying the regulated voltage Va. Note that the reference voltage source VB is a power supply circuit for generating the regulated voltage Vb. The regulated voltage Vb is used as the operating voltage of the CPU 300. A reference voltage source VC is a power supply circuit for generating a regulated voltage Vc. The regulated voltage Vc is applied to one end of the resistor R12 instead of the regulated voltage Vb. In other words, the regulated voltage Vc is used to generate the detect voltage Vsns.

The other end of the coil L1 is connected to the drain of the MOS (metal-oxide-semiconductor) transistor Tr5. The gate of the transistor Tr5 is connected to the CPU 300, and here a clock signal CLK1 is input. The source of the transistor Tr5 is connected to a ground. The transistor Tr5 operates by switching in accordance with the clock signal CLK1, and the voltage applied to the coil L1 is boosted. The other end of the coil L1 is also connected to the anode of the diode D1. This rectifies the current Ia. The cathode of the diode D1 is connected to one end of the capacitor C3 and the emitter of the transistor Tr1. The other end of the capacitor C3 is connected to a ground. The current Ia is smoothed by the capacitor C3. The voltage across both ends of the capacitor C3 corresponds to the output voltage Ve. In other words, the regulated voltage Va is boosted to the output voltage Ve. The output voltage Ve is a voltage (for example, +150 V) sufficient enough to inhibit adhesion of the toner t.

The developing power supply VRS includes a boost transformer T1, a control circuit 701, a diode D2, a capacitor C4, and a feedback circuit 702. A clock signal CLK2 from the CPU 300 and a feedback voltage Vfb from the feedback circuit 702 are input to the control circuit 701. The feedback circuit 702 detects the toner supply bias Vrs and generates the feedback voltage Vfb. The output of the control circuit 701 is determined by the clock signal CLK2 and the feedback voltage Vfb. The control circuit 701 may include a switch circuit for driving the boost transformer T1. The voltage generated on the secondary side of the boost transformer T1 is rectified by the diode D2, smoothed by the capacitor C4, and becomes direct current (DC) voltage. This DC voltage is applied to the supplying roller 17 as the toner supply bias Vrs.

Time of Start of Rotation (Pre-rotation State)

When rotation is started, the power supply apparatus 10 generates the development voltage Vdc as a voltage with a positive polarity to help prevent unnecessary toner adhesion. The operations of the power supply apparatus 10 to generate the development voltage Vdc with a positive polarity are as described above.

When rotation is started, the clock signal CLK1 from the CPU 300 is input to the transistor Tr5 of the boost circuit 600. Accordingly, the boost circuit 600 boosts the regulated voltage Va and generates the output voltage Ve (for example, +150 V). The detect voltage Vsns at the bias circuit 200 is supplied to the inverting input terminal V− of the operational amplifier OP1. Also, the set voltage Vtgt is supplied to the non-inverting input terminal V+ of the operational amplifier OP1. In this manner, the lower the duty ratio (set voltage Vtgt) of the PWM signal, the greater the absolute value of the development voltage Vdc (negative polarity). A protection circuit 703 is added to prevent the output terminal of the operational amplifier OP1 having a high withstanding voltage. The protection circuit 703 includes a transistor Tr4 and resistors R16 and R17. The resistors R16 and R17 are resistors for making the transistor Tr4 operate stably. In a case where the protection circuit 703 is not provided, the base current of the transistors Tr1 and Tr2 flow to the operational amplifier OP1 as a sink current. However, in a case where the protection circuit 703 is provided, the base current of the transistors Tr1 and Tr2 flow as a collector current of the transistor Tr4 inside the protection circuit 703. This protects the output terminal of the operational amplifier OP1. Note that in the case where the protection circuit 703 is additionally provided, the logic of the output terminal of the operational amplifier OP1 needs to be inverted. Thus, this is changed in FIG. 15, with the detect voltage Vsns being input into the inverting input terminal of the operational amplifier OP1, and the set voltage Vtgt being input into the non-inverting input terminal of the operational amplifier OP1.

A voltage of +150 V is applied, as the development voltage Vdc, to the developing roller 15 when rotation is started. Whereas a voltage of −50 V is applied, as the toner supply bias Vrs, to the supplying roller 17. Thus, the potential difference between the developing roller 15 and the supplying roller 17 is roughly 200 V. However, because the developing roller 15 and the supplying roller 17 are rotating, minimal wear is caused by electrolysis.

Time of Normal Operation (Image Formation State)

In normal operation, the power supply apparatus 10 outputs a voltage (for example, −400 V) with a negative polarity as the development voltage Vdc. In this manner, development of the toner is accelerated.

In normal operation, the boost circuit 600 is stopped, and the output voltage Ve supplied to the bias circuit 200 is equal to the regulated voltage Va. Thus, the development voltage Vdc is controlled to a voltage with a negative polarity.

A voltage of approximately −400 V is applied, as the development voltage Vdc, to the developing roller 15 in normal operation. A voltage of approximately −600 V is applied, as the toner supply bias Vrs, to the supplying roller 17. Thus, the potential difference between the developing roller 15 and the supplying roller 17 is roughly 200 V. However, because the developing roller 15 and the supplying roller 17 are rotating, minimal wear is caused by electrolysis.

Post-rotation State

Even in the post-rotation state, there is a demand to reduce the likelihood of unnecessary toner adhesion as in the pre-rotation state. Thus, the development voltage Vdc in the post-rotation state is equal to the development voltage Vdc in the pre-rotation state. Accordingly, the operations of the power supply apparatus 10 in the post-rotation state are the same as the operations of the power supply apparatus 10 in the pre-rotation state.

Standby State

In the standby state, the developing roller 15 and the supplying roller 17 are stopped. Thus, there is a demand to reduce the wear caused by electrolysis. To minimize or prevent electrolysis, the CPU 300 controls the potential difference between the development voltage Vdc and the toner supply bias Vrs.

Figure 16:
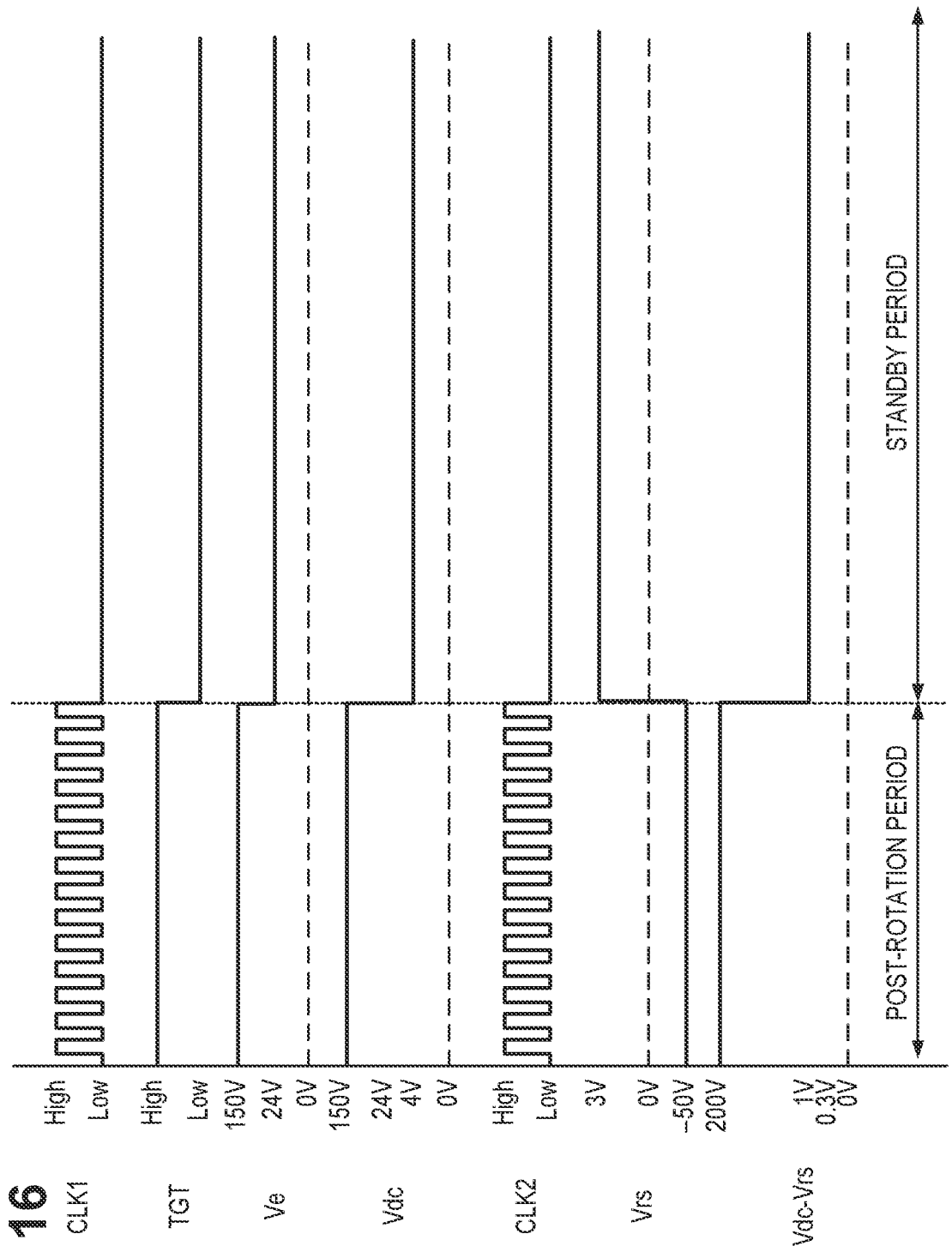
FIG. 16 is a timing chart for describing the changes in control signals, voltages, and potential differences according to one embodiment.

FIG. 16 is a timing chart illustrating changes in the signals and voltages when a transition occurs from the post-rotation state to the standby state. A post-rotation period is a period in which the post-rotation state is continuing. A standby period is a period in which the standby state is continuing. In the post-rotation period, when cleaning of the photosensitive drum 11 and the like is complete, the operation state of the image forming apparatus 1 transitions to the standby state.

S1: The CPU 300 switches off (constant, L-state) the clock signal CLK1.

S2: When the clock signal CLK1 is switched off, the boost circuit 600 stops. Thus, the output voltage Ve applied to the emitter of the transistor Tr1 is roughly equal to Va.

S3: The CPU 300 switches off (constant, L-state) the clock signal CLK2.

S4: With the clock signal CLK2 turning to off, the toner supply bias Vrs is obtained via the following Equation.

$$Vrs = (Ve - Vce1 - Vce2) \times \left(\frac{R_{T1}}{R0 + R_{T1}}\right) + Vf_{D2} \quad \text{Eq 16}$$

Here, RT1 is a resistance component of the transformer T1. $Vf_{D2}$ is the forward voltage of the diode D2. In this example, Ve is +24 V, Vce1 and Vce2 are 0.3 V, $R_{T1}$ is 1 kΩ, R0 is 2 MΩ, and $Vf_{D2}$ is 2.5 V. In this case, the toner supply bias Vrs is roughly 3 V.

S5: The CPU 300 sets the duty ratio of the PWM signal for generating the set voltage Vtgt to the minimum value (constant, L-state).

S6: As a result, the voltage of the non-inverting input terminal V (+) of the operational amplifier OP1 decreases, and the output voltage Vo of the operational amplifier OP1 becomes roughly 0 V.

S7: The base current of the transistor Tr4 of the protection circuit 703 decreases, and the transistor Tr4 becomes non-saturated.

S8: The base current of the transistor Tr1 decreases, and the transistor Tr1 becomes non-saturated. In this manner, because the protection circuit 703 is provided, the state of the transistor Tr1 when the output voltage Vo is roughly 0 V is logically inversed.

S9: The base current of the transistor Tr2 decreases, and the transistor Tr2 becomes non-saturated. As with the transistor Tr1, because the protection circuit 703 is provided, the state of the transistor Tr2 when the output voltage Vo is roughly 0 V is logically inversed.

S10: The development voltage Vdc is obtained by the following Equation.

$$Vdc = Ve \times \left( \frac{R0 + R_{T1}}{R10 + R1 + R2 + R0 + R_{T1}} \right) + Vf_{D2} \qquad \text{Eq 17}$$

In this example, Ve is +24 V, $R_{T1}$ is 1 kΩ, R0 is 2 MΩ, R10 is 10 kΩ, R1 is 15 MΩ, R2 is 15 MΩ, and $Vf_{D2}$ is 2.5 V. In this case, the development voltage Vdc is roughly 4 V.

In the power supply apparatus 10 according to Example 3, in the image formation state, the development voltage Vdc with a negative polarity is output, and, in the pre-rotation state and the post-rotation state, the development voltage Vdc with a positive polarity is output. In this manner, the likelihood of toner marking the back surface of the sheet P due to unnecessary toner adhesion is reduced. Furthermore, in the standby state, the potential difference between the development voltage Vdc and the toner supply bias Vrs can be set to approximately 1 V. Accordingly, electrolysis at the developing roller 15 and the supplying roller 17 occurs less, and the service life of the developing roller 15 and the supplying roller 17 is increased. As a result, density non-uniformity in the toner image and the like caused by wear of the developing roller 15 and the supplying roller 17 is less likely to occur.

Figure 17:
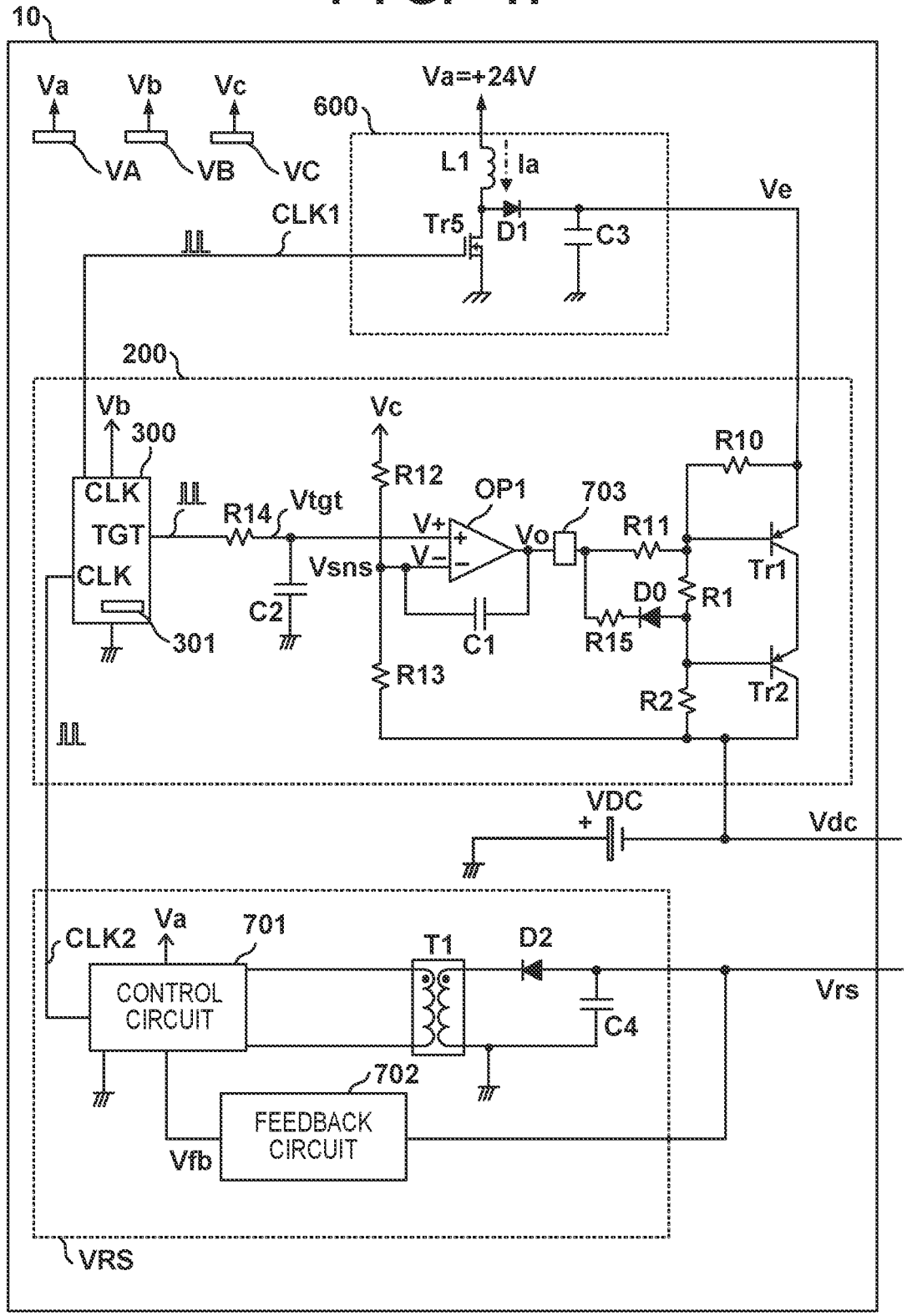
FIG. 17 is a circuit diagram of a portion of a power supply apparatus according to one embodiment.

In Example 3, the CPU 300 appropriately controls the boost circuit 600 and the bias circuit 200 to generate the development voltage Vdc with a positive polarity and the development voltage Vdc with a negative polarity. In the example, the boost circuit 600 and the bias circuit 200 are illustrated with a specific circuit diagram, however this is merely an example. For example, as illustrated in FIG. 17, a power supply (for example, voltage source VDC) for generating the development voltage Vdc and a power supply for generating the toner supply bias Vrs may be independently provided. In this case, the CPU 300 controls the boost circuit 600, the bias circuit 200, and the developing power supply VRS to make the development voltage Vdc and the toner supply bias Vrs equal. Accordingly, in the standby state, electrolysis occurs less, and the service life of the developing roller 15 and the supplying roller 17 is increased.

Example 4

In Example 3, the CPU 300 controls the development voltage Vdc and the toner supply bias Vrs to reduce the potential difference between the developing roller 15 and the supplying roller 17. However, with the circuit configuration described in Example 3, a small potential difference may occur between the developing roller 15 and the supplying roller 17. Here, in Example 4, the CPU 300 stops a reference voltage source VA supplying the regulated voltage Va to the boost circuit 600. Accordingly, the potential difference between the developing roller 15 and the supplying roller 17 is controlled to a lower value (roughly 0 V).

Figure 18:
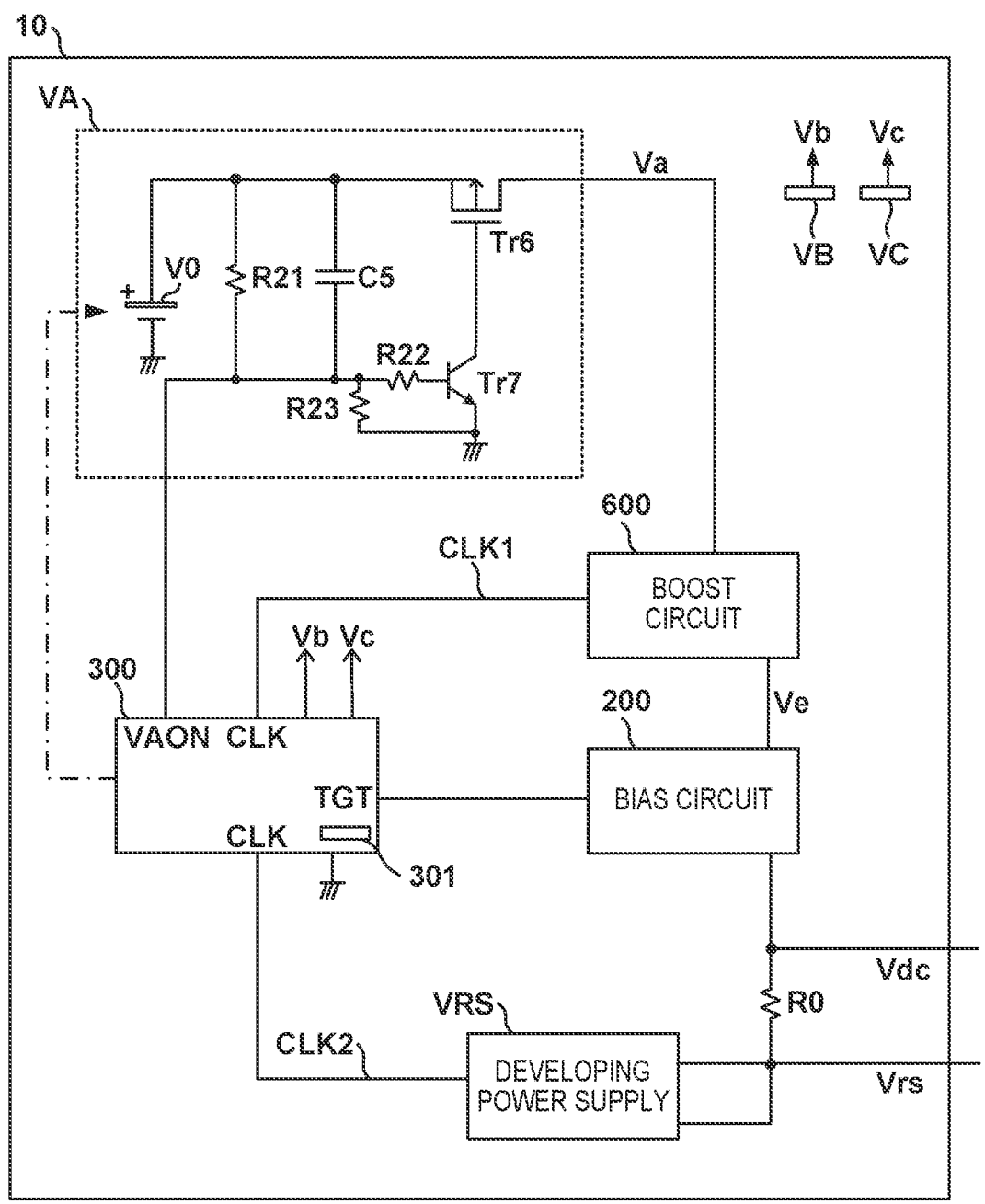
FIG. 18 is a circuit diagram of a portion of a power supply apparatus according to one embodiment.

FIG. 18 is a diagram illustrating the power supply apparatus 10 of Example 4. In Example 4, descriptions of points shared with Example 3 are omitted. In Example 4, the reference voltage source VA includes a reference voltage source V0 for generating a reference voltage from alternating current supplied from a commercial power supply. Furthermore, the reference voltage source VA includes a transistor Tr6, a transistor Tr7, a capacitor C5, and resistors R21, R22, and R23. The transistor Tr6 is a MOS field effect transistor (FET). One end of the resistor R21, one end of the capacitor C5, and the source of the transistor Tr6 are connected to the positive terminal of the reference voltage source V0. The drain of the transistor Tr6 outputs the regulated voltage Va. The other end of the resistor R21 and the other end of the capacitor C5 are connected to a control terminal VAON of the CPU 300. Furthermore, the control terminal VAON is connected to the base of the transistor Tr7 via the resistor R22. The resistor R23 is connected between the emitter and base of the transistor Tr7 to stabilize the operations of the transistor Tr7. The collector of the transistor Tr7 is connected to the gate of the transistor Tr6. When the CPU 300 switches a control signal VAON on and off, the reference voltage source VA is switched on and off. This means that the regulated voltage Va is output or stopped.

Post-rotation State and Standby State

Figure 19:
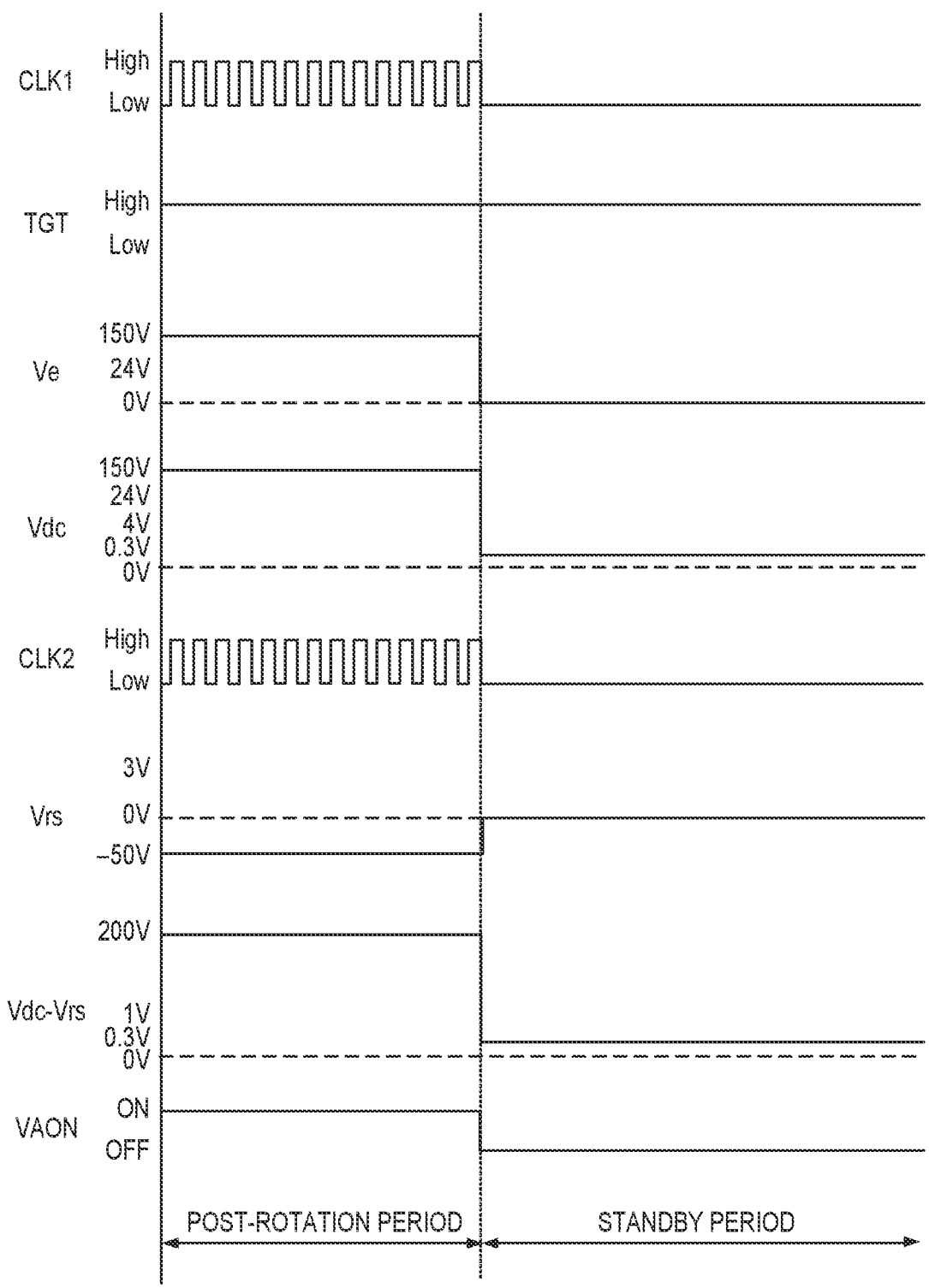
FIG. 19 is a timing chart for describing the changes in control signals, voltages, and potential differences according to one embodiment.

FIG. 19 is a diagram illustrating the potential difference between the developing roller 15 and the supplying roller 17 being reduced by the output of the reference voltage source VA being switched to off.

S1: The CPU 300 switches off (constant, L-state) the clock signal CLK1.

S2: When the clock signal CLK1 is switched off, the boost circuit 600 stops. Thus, the output voltage Ve applied to the emitter of the transistor Tr1 is roughly equal to Va.

S3: The CPU 300 switches off (constant, L-state) the clock signal CLK2.

S4: With the clock signal CLK2 turning to off, the toner supply bias Vrs becomes a value obtained via Equation 6.

S5: The CPU 300 switches the control signal VAON from on to off.

S6: The base current of the transistor Tr7 decreases, and the transistor Tr7 becomes non-saturated.

S7: The transistor Tr6 switches from on to off. As a result, the connection between the reference voltage source VA and the boost circuit 600 is cut off, and the regulated voltage Va becomes roughly 0 V.

S8: The development voltage Vdc is obtained by Equation 18.

$$Vdc = Vc \times \left( \frac{R0}{R12 + R13 + R0} \right) \qquad \text{Eq 18}$$

In this example, the regulated voltage Vc is +5 V, R12 is 300 kΩ, R13 is 30 MΩ, and R0 is 2 MΩ. In this case, from Equation 18, the development voltage Vdc is calculated to be roughly 0.3 V.

S9: The CPU 300 switches off (constant, L-state) the clock signal CLK2. Thus, the toner supply bias Vrs corresponds to a value within a range from roughly 0 V to the development voltage Vdc.

S10: The potential difference between the development voltage Vdc and the toner supply bias Vrs is, at a maximum, roughly 0.3 V. Typically, the regulated voltage Vc used in the feedback circuit is lower than the regulated voltage Va used for outputting a high voltage. Thus, the potential difference between the developing roller 15 and the supplying roller 17 can easily be further reduced by the output of the reference voltage source VA being switched to off.

The circuit configuration of the reference voltage source VC for outputting the regulated voltage Vc may use a similar circuit configuration as that of the reference voltage source VA. In other words, the reference voltage source VC may also be provided with a load switch including the transistors Tr6 and Tr7. This allows the CPU 300 to stop the reference voltage source VC and control the regulated voltage Vc to roughly 0 V.

Figure 20:
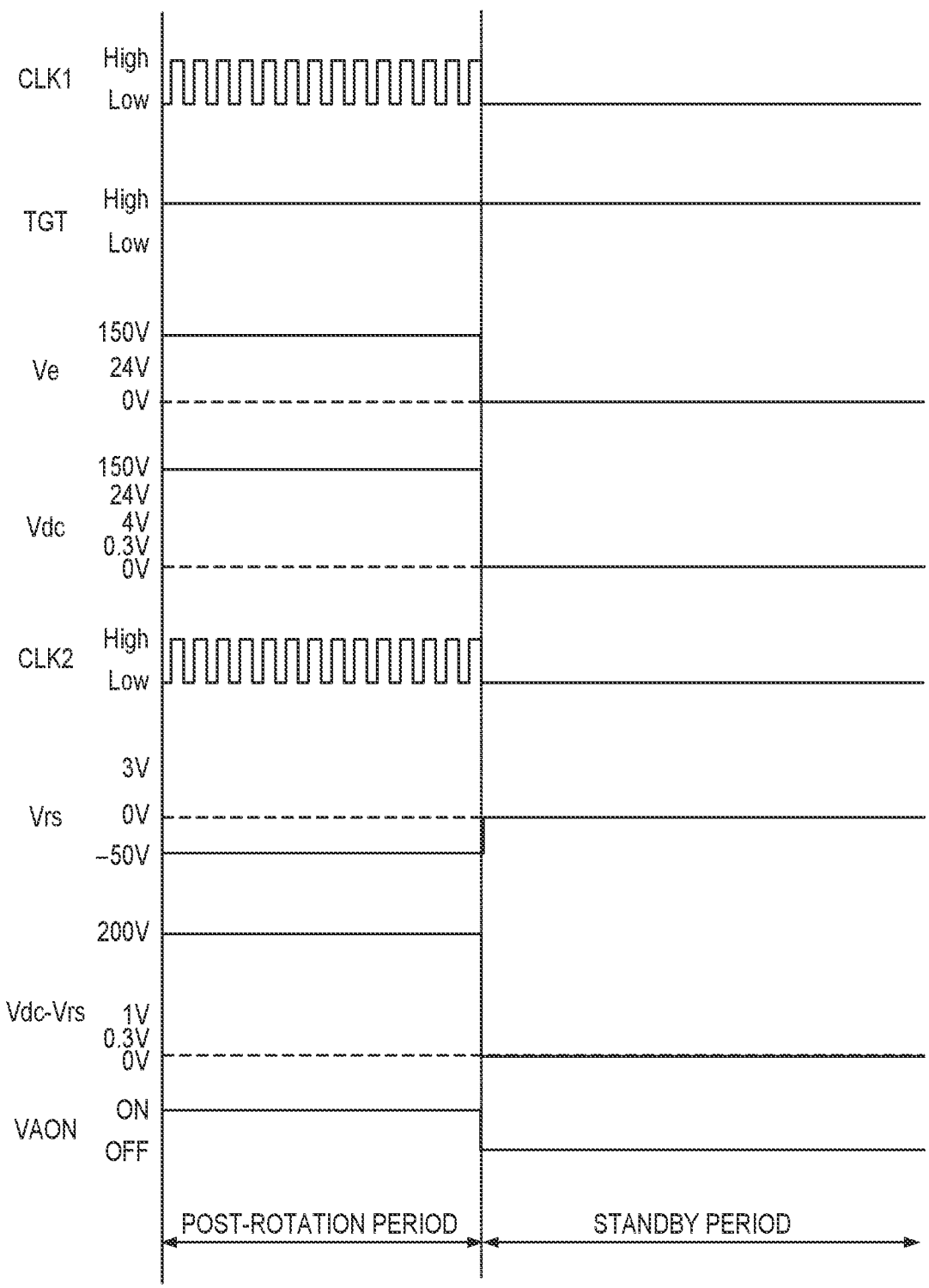
FIG. 20 is a timing chart for describing the changes in control signals, voltages, and potential differences according to one embodiment.

FIG. 20 is a diagram illustrating changes in the signals and voltages of a circuit configuration in which the reference voltage source VA as well as the reference voltage source VC can be switched off. Compared to FIG. 19, in FIG. 20, the reference voltage source VC and one end of the resistor R12 are cut off by the load switch of the reference voltage source VC being switched to off. According to Equation 18, when the regulated voltage Vc is roughly 0 V, the development voltage Vdc becomes roughly 0 V. Thus, the toner supply bias Vrs also becomes roughly 0 V, and the potential difference between the developing roller 15 and the supplying roller 17 also becomes roughly 0 V.

In this manner, in Example 4, a similar effect to that of Example 3 is exhibited. Furthermore, compared to Example 3, in Example 4, the potential difference between the development voltage Vdc and the toner supply bias Vrs can be further reduced. For example, the potential difference between the developing roller 15 and the supplying roller 17 can be controlled to roughly 0 V. As a result, in Example 4, the service life of the developing roller 15 and the supplying roller 17 can be further extended. Also, density non-uniformity in the toner image can also be reduced.

In Example 4, the voltage outputting function of the reference voltage sources VA and VC are stopped by the transistors Tr6 and Tr7. However, this circuit configuration is merely one example. Other switching elements such as an on/off relay may be used as the voltage output terminal of the reference voltage sources VA and VC. Alternatively, as indicated by the dot-dash line in FIG. 18, the CPU 300 may stop the voltage output function of the reference voltage sources VA and VC by controlling the output of the reference voltage source V0 to 0 V.

Example 5

In Example 4, the potential difference between the developing roller 15 and the supplying roller 17 can be set to roughly 0 V. This allows the voltage of the developing roller 15 and the voltage of the supplying roller 17 to be reduced to roughly 0 V. But this increases the time taken to transition from the standby state to the pre-rotation state. In other words, the time need to raise the development voltage Vdc to the target voltage is increased. The method according to Example 5 described herein is more advantageous than Example 4 in terms of the time taken from a printing instruction to printing completion.

Figure 21:
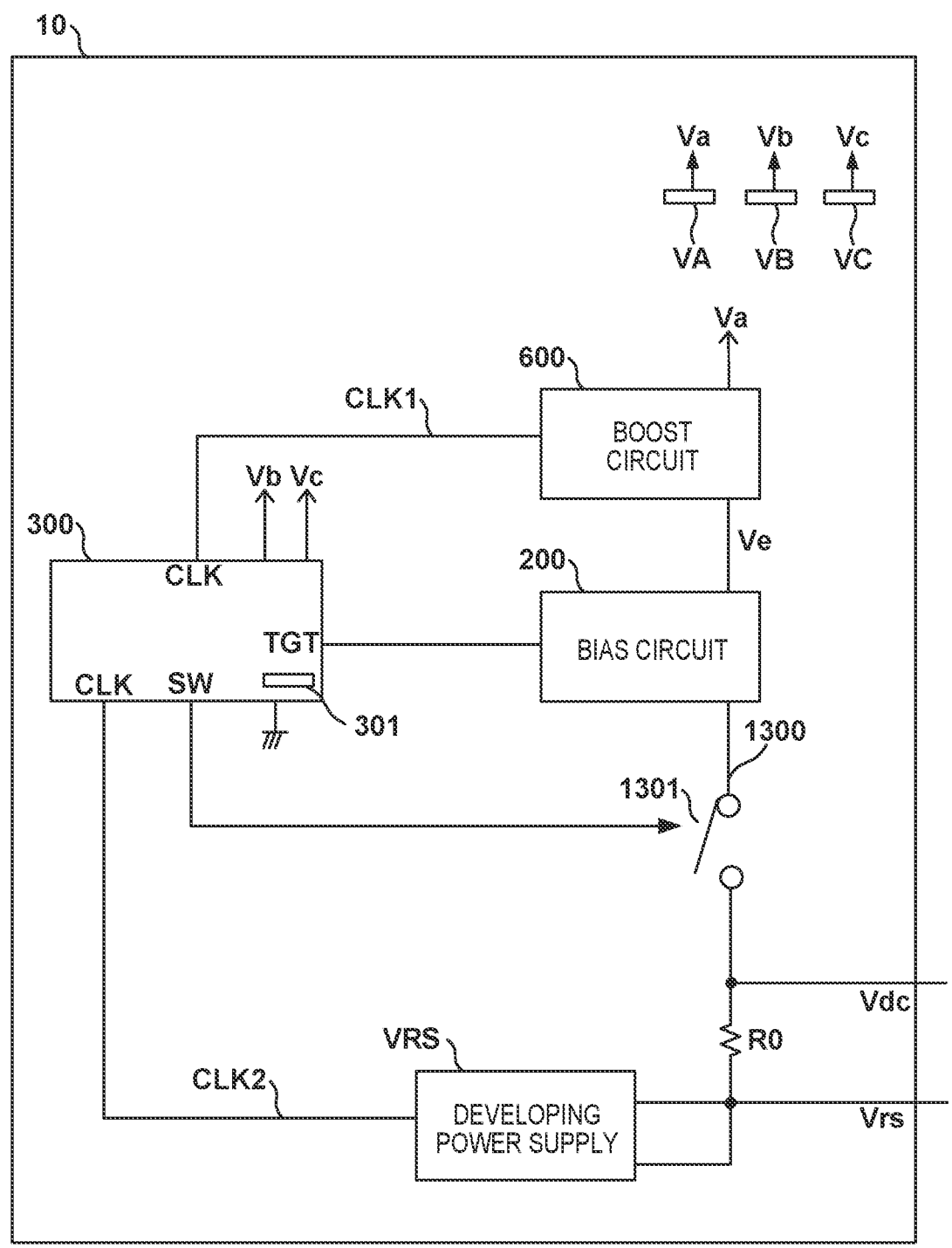
FIG. 21 is a circuit diagram of a portion of a power supply apparatus according to one embodiment.

As illustrated in FIG. 21, in Example 5, the bias circuit 200 and the developing roller 15 are connected, and a switch 1301 is inserted in a power supply line 1300 for supplying the development voltage Vdc to the developing roller 15. The switch 1301 is a cut-off circuit or cut-off element for connecting the bias circuit 200 and the developing roller 15 or cutting off the connection in accordance with a switch signal SW output from the CPU 300. The switch 1301 can be implemented using a relay, a semiconductor switch, or the like.

Post-rotation Period and Standby Period

In Example 5, by cutting off the bias circuit 200 and the developing roller the potential difference between the developing roller 15 and the supplying roller 17 can be set to roughly 0 V. This allows the wear of the developing roller and the supplying roller 17 caused by electrolysis to be reduced.

Figure 22:
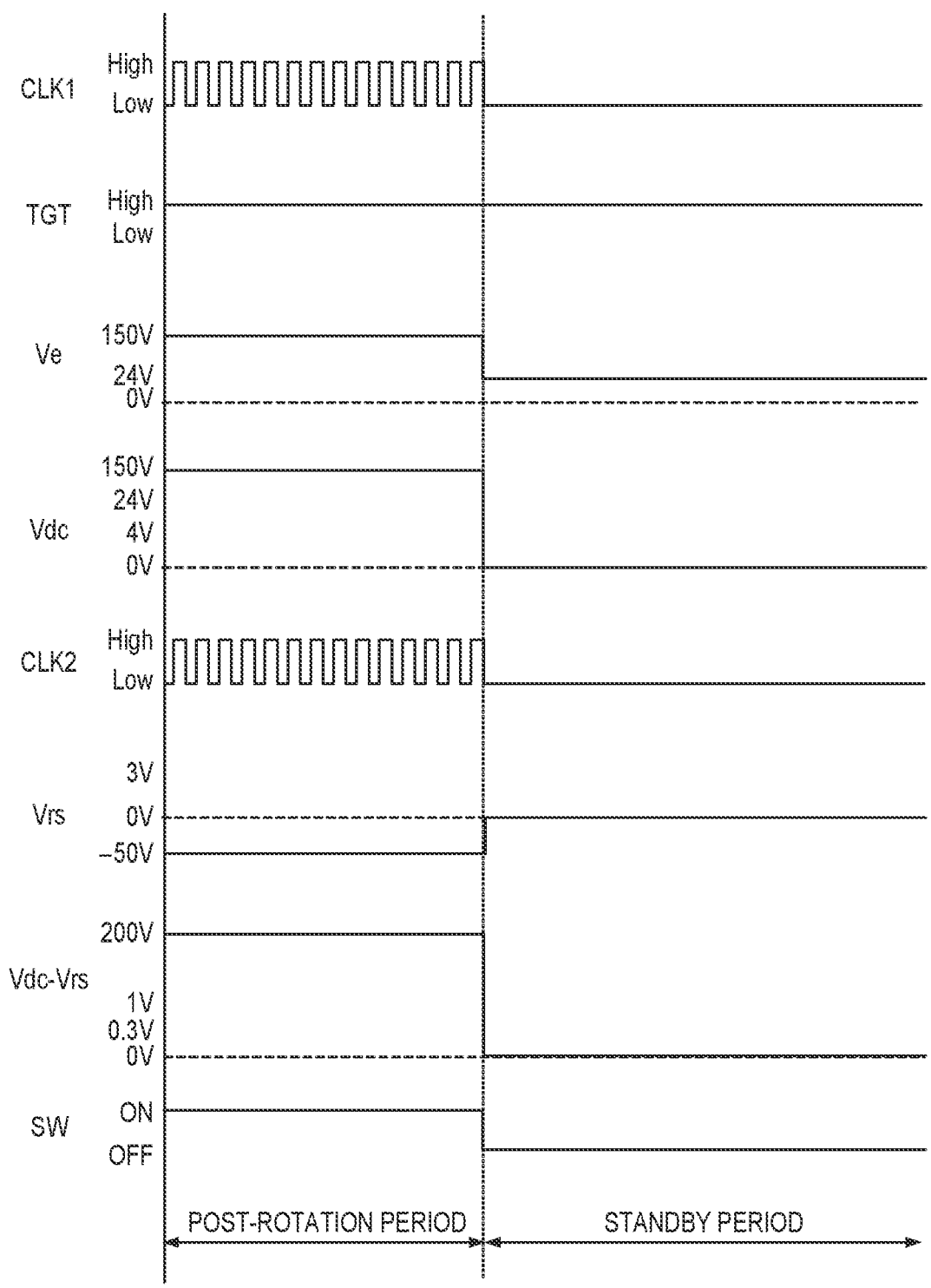
FIG. 22 is a timing chart for describing the changes in control signals, voltages, and potential differences according to one embodiment.

FIG. 22 is a diagram illustrating the changes in the signals and voltages in a circuit configuration using the switch 1301. When image formation ends, the operation state transitions to the post-rotation state. Then, the operation state transitions from the post-rotation state to the standby state. In the pre-rotation state, the image formation state, and the post-rotation state described above, the switch 1301 is controlled to be on. Other changes in the signals and voltages are the same as the changes described in Example 3 or Example 4. Also, in Example 5, the initial operation of transitioning from the post-rotation state to the standby state is the same as that in Example 3. Thus, only the differences with Example 3 will be described below.

S1: The CPU 300 switches the switch signal SW from on to off. The switch signal SW is a control signal for switching the switch 1301 on (connected state) and off (cut-off state).

S2: The switch 1301 switches from on to off, and the bias circuit 200 and the developing roller 15 transitions from a conductive state to a non-conductive state.

S3: The CPU 300 switches off (constant, L-state) the clock signal CLK2. In this manner, because the developing power supply VRS stops, the toner supply bias Vrs becomes roughly 0 V.

S4: The potential difference between the development voltage Vdc and the toner supply bias Vrs becomes roughly 0 V.

At this time, the output voltage Ve has already increased to the target voltage of +24 V. Thus, when a printing instruction is input, the CPU 300 switches the switch 1301 from off to on. Accordingly, the development voltage Vdc is promptly applied to the developing roller 15.

In this manner, by electrically separating the bias circuit 200 and the developing roller 15 with the switch 1301, the potential difference between the development voltage Vdc and the toner supply bias Vrs can be controlled to roughly 0 V. Because the potential difference between the developing roller 15 and the supplying roller 17 becomes roughly 0 V, the wear caused by electrolysis can be greatly reduced. Also, a decrease in the quality of the toner image caused by wear of the developing roller 15 is also less likely to occur. Also, in the standby state, because a high voltage with positive polarity is applied to the developing roller 15, the back surface of the sheet is less likely to be marked with unnecessary toner.

In Example 5, the bias circuit 200 and the developing roller 15 are cut off by the switch 1301, which can be controlled by a control signal from the CPU 300. However, the control signal for controlling the on and off of the switch 1301 may be not be output from the CPU 300. For example, in another configuration, the switch 1301 switches from on to off on the basis of the output voltage Ve decreasing from 150 V to 24V. Alternatively, in another configuration, the switch 1301 switches from on to off on the basis of the toner supply bias Vrs increasing from −50 V to 0 V. In this case, an output port for outputting the switch signal SW does not need to be provided in the CPU 300, allowing costs to be reduced.

Figure 23:
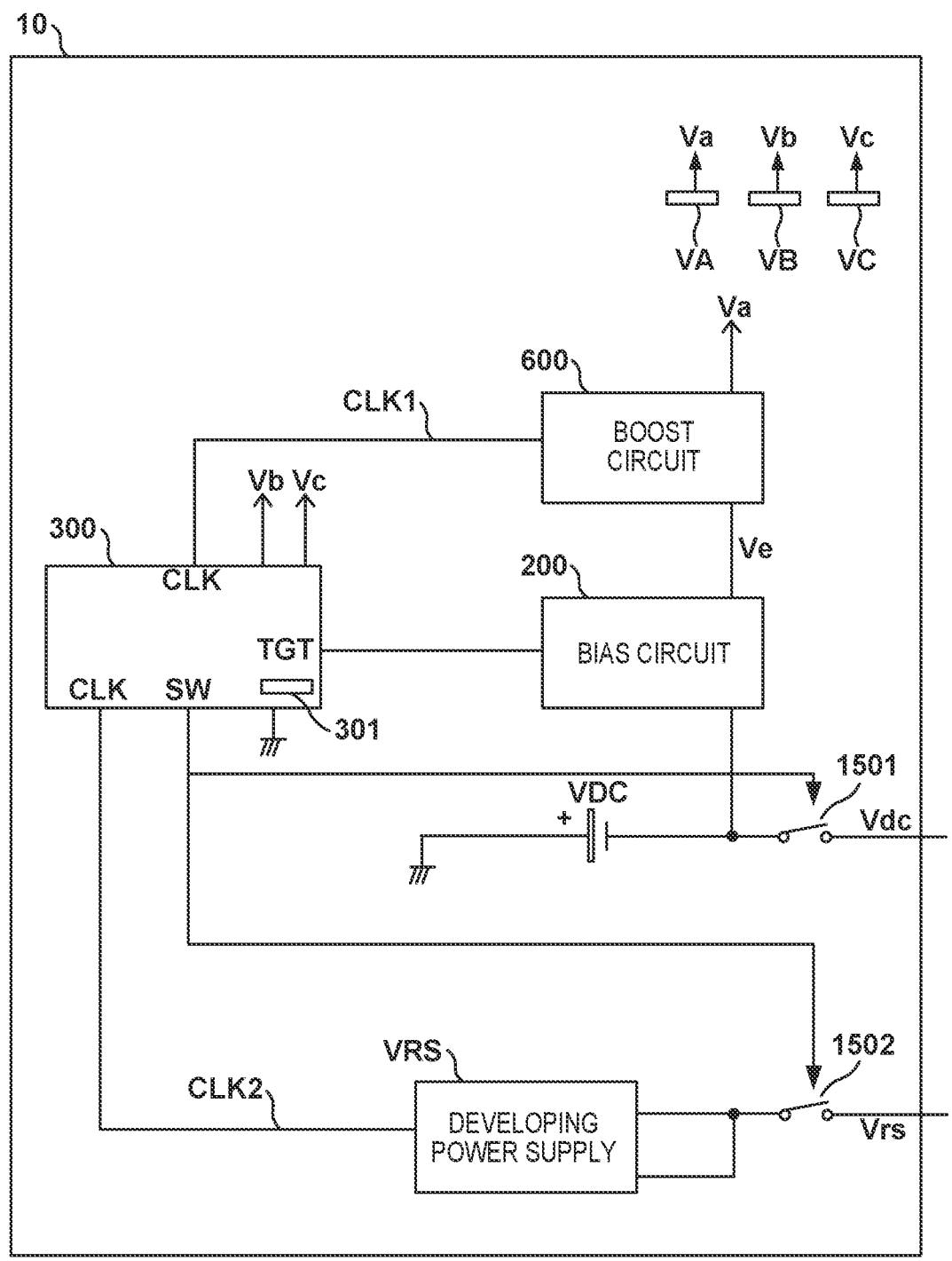
FIG. 23 is a circuit diagram of a portion of a power supply apparatus according to one embodiment.

In a case where the output terminal of the development voltage Vdc and the output terminal of the toner supply bias Vrs are physically separated as illustrated in FIG. 17, the technical idea of Example 3 can be applied. In other words, as illustrated in FIG. 23, a switch 1501 may be inserted in a power supply line for connecting the developing roller 15 to the bias circuit 200 and a power supply VDC. Also, a switch 1502 may be inserted in a power supply line for connecting the supplying roller 17 to the developing power supply VRS. When the state transitions from the post-rotation state to the standby state, the CPU 300 uses the switch signal SW to switch the switches 1501 and 1502 from on to off. Accordingly, the potential difference between the developing roller 15 and the supplying roller 17 may be controlled to roughly 0 V.

Technical Ideas Derived from Examples 3 to 5

Perspectives 1 and 20

The photosensitive drum 11 is an example of a rotating image carrier. The developing roller 15 is an example of a developing member disposed opposite the image carrier for developing the electrostatic latent image formed on the image carrier using toner and forming a toner image. The supplying roller 17 is an example of a supplying member disposed opposite the developing member for supplying toner to the developing member. The transfer roller 16 is an example of a transfer member for transferring the toner image formed on the image carrier to the target transfer member. The target transfer member is a sheet or an intermediate transfer member (for example, an intermediate transfer belt), for example. The boost circuit 600, the bias circuit 200, and the resistor R0 function as the first power supply for generating a development voltage of the first polarity or the second polarity to be applied to the developing member. The second polarity is the opposite of the first polarity. The developing power supply VRS is an example of the second power supply for generating an acceleration voltage for accelerating the supply of toner to the developing member from the supplying member to be applied to the supplying member. The CPU 300 is an example of a control unit for controlling the first power supply and the second power supply. The CPU 300 controls the first power supply so that the development voltage (for example, +150 V) with the first polarity is applied to the developing member in the first period. The first period is the preparation period (for example, a pre-rotation period, the post-rotation period) in which the likelihood of unnecessary toner adhering to the image carrier is reduced, for example. The CPU 300 controls the first power supply so that the development voltage with the second polarity is applied to the developing member in the second period in which the electrostatic latent image formed on the image carrier is developed using toner. The second period may be referred to as a development period, for example. The third period different from the first period may exist. Note that the third period may be different from the second period. The third period may be the standby period in which a toner image is not formed on the image carrier, for example. The CPU 300 controls the first power supply and the second power supply so that the potential difference between the developing member and the supplying member in the third period is less than the potential difference between the developing member and the supplying member in the first period and the second period. This allows the likelihood of unnecessary toner adhering to the back surface of the sheet to be reduced and the service life of the members involved with development to be increased. Note that the power supply apparatus 10 is an example of a power supply apparatus for supplying power to an image forming apparatus.

Perspective 2

The control unit may, in a third period, control the first power supply and the second power supply so that the potential difference between the developing member and the supplying member is equal to or less than a predetermined potential difference which is capable of reducing occurrences of electrolysis at the developing member and the supplying member. This allows the likelihood of unnecessary toner adhering to the back surface of the sheet to be reduced and the service life of the members involved with development to be increased.

Perspective 3

For example, the first period (for example, a period corresponding to the post-rotation state) may be a period after the second period, and the third period may be a period after the first period. Note that a fourth period (for example, a period corresponding to the pre-rotation state) similar to the first period may exist before the second period.

Perspective 4

The absolute value of the potential difference between the developing member and the supplying member in the third period is less than the absolute value of the potential difference between the developing member and the supplying member in the second period. In the second period, because the developing member and the supplying member are rotating, wear caused by electrolysis is less likely to occur. However, because the developing member and the supplying member are not rotating in the third period, wear caused by electrolysis is likely to advance. Thus, by making the potential difference in the third period less than the potential difference in the second period, the service life of the members involving development may be increased.

Perspective 5

A surface member of the developing member and/or the supplying member may include an ion conductive member. When there is a large potential difference between two opposite ion conductive members, electrolysis occurs, and the contact surface of the two ion conductive members experiences wear. Accordingly, various embodiments of the present disclosure can be useful in cases where a material that experiences electrolysis, such as an ion conductive member, is used as a surface member.

Perspective 6

The reference voltage source VA is an example of a first generating circuit for generating a regulated voltage (for example, Va=+24 V) with the first polarity. The boost circuit 600 is an example of a boost circuit controlled by the control unit for boosting the regulated voltage to a voltage (for example, Ve=+150 V) with the first polarity. The bias circuit 200 is an example of a second generating circuit connected to the boost circuit. The second generating circuit outputs a development voltage with the first polarity in the first period. The second generating circuit outputs a development voltage with the second polarity in the second period. The second generating circuit may be controlled in terms of its output by the control unit so that, in the third period, the potential difference between the developing member and the supplying member is equal to or less than a predetermined potential difference.

Perspective 7

The resistor R0 is an example of a resistor for connecting the supplying member and the developing member. The second generating circuit controls the current flowing from the boost circuit to the resistor, via the second generating circuit, in the second period. In this manner, the second generating circuit generates a development voltage with the second polarity. The second generating circuit suppresses the current flowing from the boost circuit to the resistor, via the second generating circuit, in the first period. In this manner, the second generating circuit generates a development voltage with the first polarity. The second generating circuit reduces the development voltage to a predetermined voltage or lower in the third period.

Perspective 8

The boost circuit 600 may stop boosting the regulated voltage in the third period. This reduces the development voltage.

Perspective 9

The second power supply controls the absolute value of the acceleration voltage to a first value (for example, −50 V) in the first period. The second power supply controls the absolute value of the acceleration voltage to a second value (for example, −600 V) greater than the first value in the second period. The second power supply may control the absolute value of the acceleration voltage to a third value (for example, +3 V) less than the first value in the third period.

Perspectives 10 and 11

The control unit may control the first generating circuit so that the development voltage is brought close to 0 V (for example, from 0 to 4V (0.3 V) in the third period. The control unit may control the second power supply so that the output voltage of the second power supply is brought close to 0 V (for example, from 0 to 3 V (0.3 V) in the third period.

Perspectives 12 to 15

The control unit may stop the first power supply in the third period. This brings the development voltage closer to 0 V. The control unit may stop the boost circuit in the third period. This brings the development voltage closer to 0 V. The control unit may stop the first power supply in the third period by stopping the first generating circuit. Also, the control unit may stop the first power supply in the third period by stopping the first generating circuit and the second generating circuit. The control unit may stop the second power supply in the third period.

Perspectives 16 to 18

The switches 1301 and 1501 are examples of a first cut-off circuit for cutting off the development voltage from the first power supply to the developing member in the third period. As illustrated in FIG. 21, in the third period, the first cut-off circuit for cutting off the development voltage from the first power supply to the developing member may be provided between the second generating circuit and a resistor. The switch 1502 is an example of a second cut-off circuit for cutting off the acceleration voltage from the second power supply to the supplying member in the third period. In this case, because the first power supply and the second power supply can be activated in preparation, when the third period ends, the state can immediately transition to the pre-rotation state. In other words, the waiting time for the user may be decreased.

Perspective 19

As illustrated in FIGS. 17 and 23, the first power supply and the second power supply may be independent of one another.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

What is claimed is:

1. A power supply apparatus for generating an output voltage, the apparatus comprising:
    a boost circuit configured to boost a voltage supplied from a reference voltage source and generates a first power supply voltage;
    a first transistor with an emitter connected to the first power supply voltage;
    a second transistor with an emitter connected to a collector of the first transistor;
    a resistance element with one end connected to a collector of the second transistor; and
    a voltage source connected to another end of the resistance element, the voltage source being for generating a second power supply voltage with a polarity opposite to a polarity of the first power supply voltage, wherein
    a collector voltage, which is an output voltage, of the second transistor is controlled by controlling an amount of base current of the first transistor.

2. The power supply apparatus according to claim 1, further comprising:
    a processor configured to control switching the boost circuit on and off, wherein the processor
        in a case where the collector voltage of the second transistor is controlled to be output with an identical polarity as the polarity of the first power supply voltage, switches the boost circuit on, and
        in a case where the collector voltage of the second transistor is controlled to be output with an opposite polarity to the polarity of the first power supply voltage and an identical polarity as a polarity of the second power supply voltage, switches the boost circuit off.

3. An image forming apparatus comprising:
a photosensitive member;
a motor configured to rotate the photosensitive member by driving the photosensitive member;
a charger applied with a charging voltage for charging a surface of the photosensitive member;
a light source configured to irradiate the surface of the photosensitive member charged by the charger with light and forming an electrostatic latent image;
a developing roller applied with a development voltage for adhering toner to the electrostatic latent image formed on the surface of the photosensitive member to form a toner image;
a transfer roller configured to transfer the toner image to an intermediate transfer member or a sheet;
a power supply apparatus configured to generate the charging voltage, which is a second power supply voltage, and the development voltage, which is an output voltage; and
a first processor configured to control the power supply apparatus, wherein
the power supply apparatus includes
   a boost circuit configured to boost a voltage supplied from a reference voltage source and generate a first power supply voltage,
   a first transistor with an emitter connected to the first power supply voltage,
   a second transistor with an emitter connected to a collector of the first transistor,
   a resistance element with one end connected to a collector of the second transistor, and
   a voltage source connected to another end of the resistance element, the voltage source being for generating the second power supply voltage with a polarity opposite to a polarity of the first power supply voltage;
wherein the first processor controls a collector voltage, which is the output voltage, of the second transistor by controlling an amount of a base current of the first transistor; and
the first processor, in a preparation period which is a period from a first time when the photosensitive member starts rotating until a second time when the light source starts forming the electrostatic latent image, controls the power supply apparatus so that the development voltage becomes an inhibiting voltage for inhibiting the toner from moving from the developing roller to the photosensitive member.

4. The image forming apparatus according to claim 3, further comprising:
a second processor configured to control switching the boost circuit on and off; wherein the second processor
   in a case where the collector voltage of the second transistor is controlled to be output with an identical polarity as the polarity of the first power supply voltage, switches the boost circuit on, and
   in a case where the collector voltage of the second transistor is controlled to be output with an opposite polarity to the polarity of the first power supply voltage and an identical polarity as a polarity of the second power supply voltage, switches the boost circuit off.

5. The image forming apparatus according to claim 3, wherein
the first processor controls a polarity of the development voltage in the preparation period to an opposite polarity to the polarity of the development voltage in an image formation period, which is a period after the second time.

6. The image forming apparatus according to claim 5, wherein
the first processor controls the development voltage to a first inhibiting voltage in a first period in the preparation period and controls the development voltage to a second inhibiting voltage lower than the first inhibiting voltage in a second period after the first period in the preparation period.

7. The image forming apparatus according to claim 6, wherein
the first processor controls the power supply apparatus so that the development voltage returns to the first inhibiting voltage in a reserve period after image formation has started and before image formation has ended.

8. The image forming apparatus according to claim 7, wherein
the first processor controls the power supply apparatus so that the development voltage returns to the second inhibiting voltage in the reserve period.

9. The image forming apparatus according to claim 7, wherein
the first processor, in the reserve period, increases the first power supply voltage output from the boost circuit and decreases the second power supply voltage output from the voltage source.

10. The image forming apparatus according to claim 3, wherein
the first processor divides the development voltage into at least two steps to decrease the development voltage in the preparation period.

11. The image forming apparatus according to claim 3, wherein
the first processor adjusts the development voltage in the preparation period by controlling the boost circuit.

12. The image forming apparatus according to claim 11, wherein
the boost circuit includes
   a coil connected to the reference voltage source,
   a switching element connected to the coil, and
   a rectification and smoothing circuit configured to rectify and smooth a current generated at the coil; and
the first processor adjusts a current flowing to the resistance element via the first transistor and the second transistor by adjusting the first power supply voltage from the boost circuit by controlling the switching element.

13. The image forming apparatus according to claim 12, wherein
the first transistor adjusts a current flowing to the resistance element in accordance with a control signal supplied from the first processor.

14. The image forming apparatus according to claim 13, wherein
when the voltage source increases the second power supply voltage, the first processor decreases the first power supply voltage supplied from the boost circuit so that a voltage applied across the emitter and the collector of the first transistor does not exceed a withstand voltage of the first transistor, and so that a voltage applied across the emitter and the collector of the second transistor does not exceed a withstand voltage of the second transistor.

15. The image forming apparatus according to claim 14, further comprising:
   a detection circuit configured to detect the development voltage and output a detected voltage, and
   a comparison circuit configured to output, as the control signal, a voltage according to a comparison result of a set voltage according to a target value of the development voltage and the detected voltage, wherein
   the first processor adjusts the development voltage by adjusting the set voltage.

16. The image forming apparatus according to claim 15, further comprising:
   a smoothing circuit configured to smooth a rectangular wave output from the first processor and generate the set voltage.

17. The image forming apparatus according to claim 3, wherein
   the first processor adjusts the development voltage by controlling a voltage generated at the resistance element on the basis of a current according to the first power supply voltage output from the boost circuit and the second power supply voltage supplied from the voltage source.

18. The image forming apparatus according to claim 3, wherein
   the first processor, in the preparation period, gradually reduces the first power supply voltage output from the boost circuit and gradually increases the second power supply voltage output from the voltage source.

* * * * *